Feb. 5, 1952  W. E. GILMORE  2,584,122
STABILIZING MECHANISM FOR VEHICLES
Filed Sept. 27, 1946  15 Sheets-Sheet 1
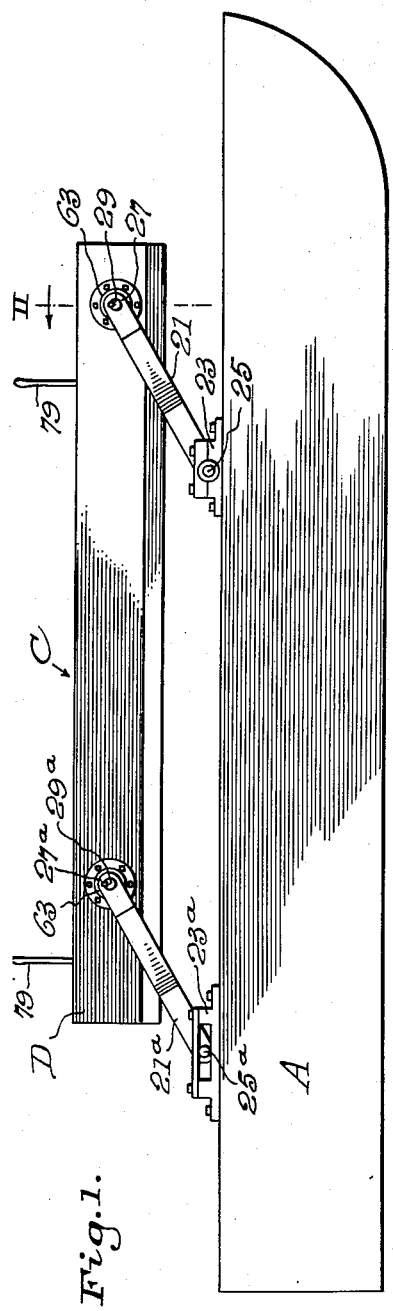
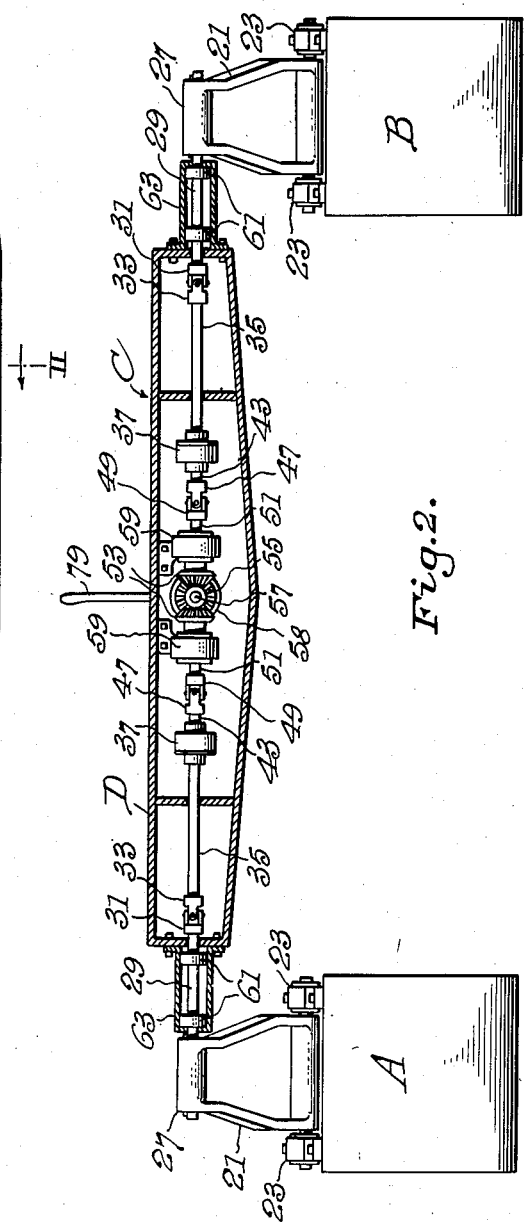
Inventor
William E. Gilmore
By
Attorneys

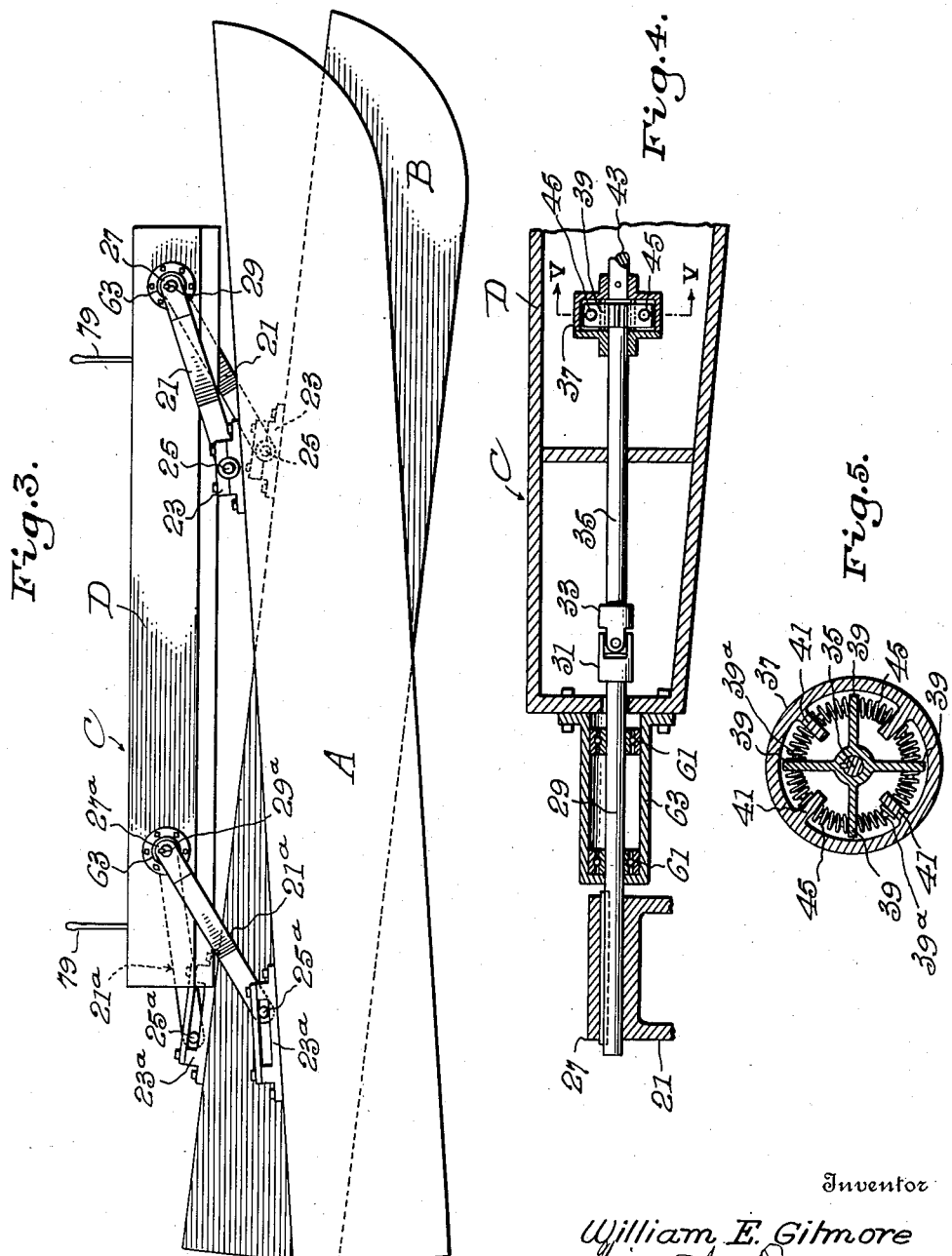

Feb. 5, 1952     W. E. GILMORE     2,584,122
STABILIZING MECHANISM FOR VEHICLES
Filed Sept. 27, 1946     15 Sheets-Sheet 4
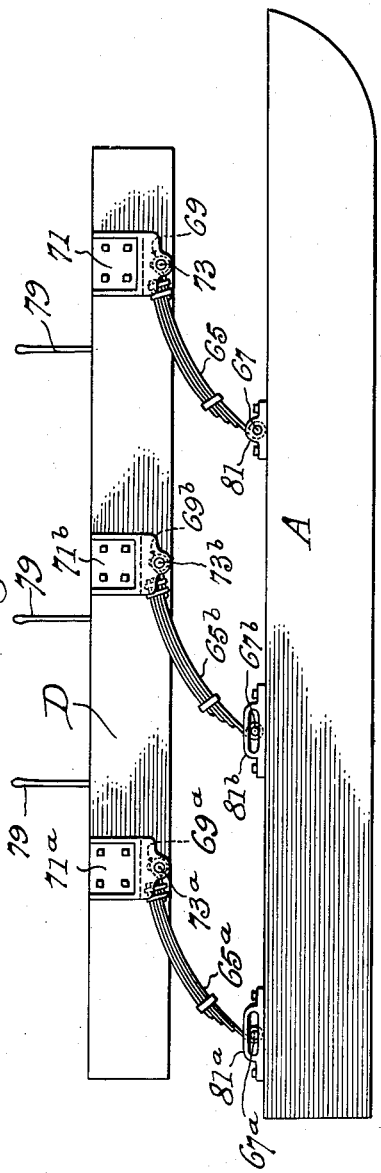
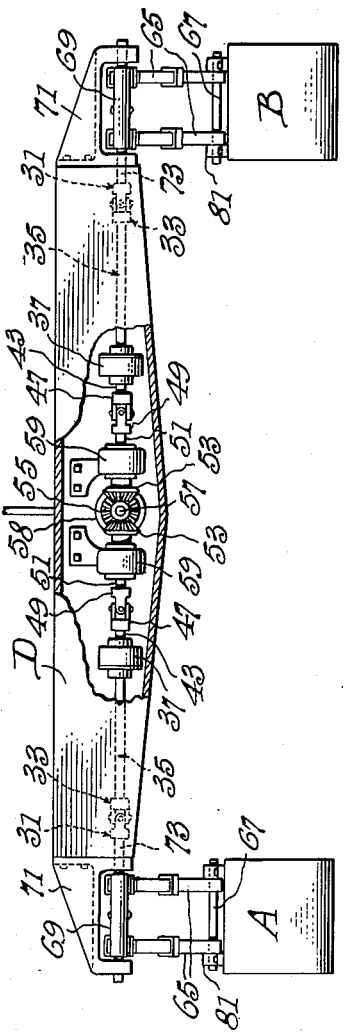
Inventor
William E. Gilmore
By
Attorneys

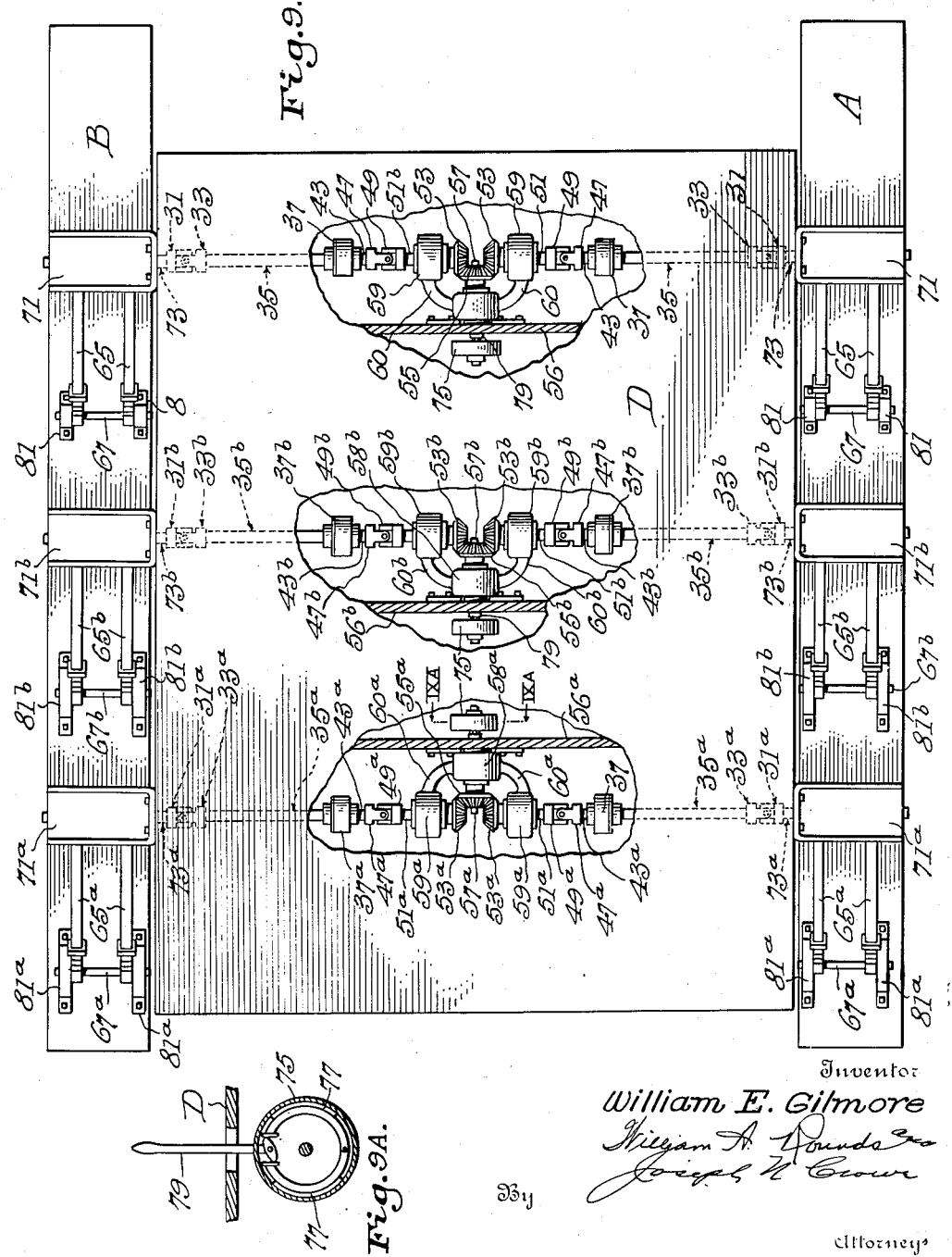

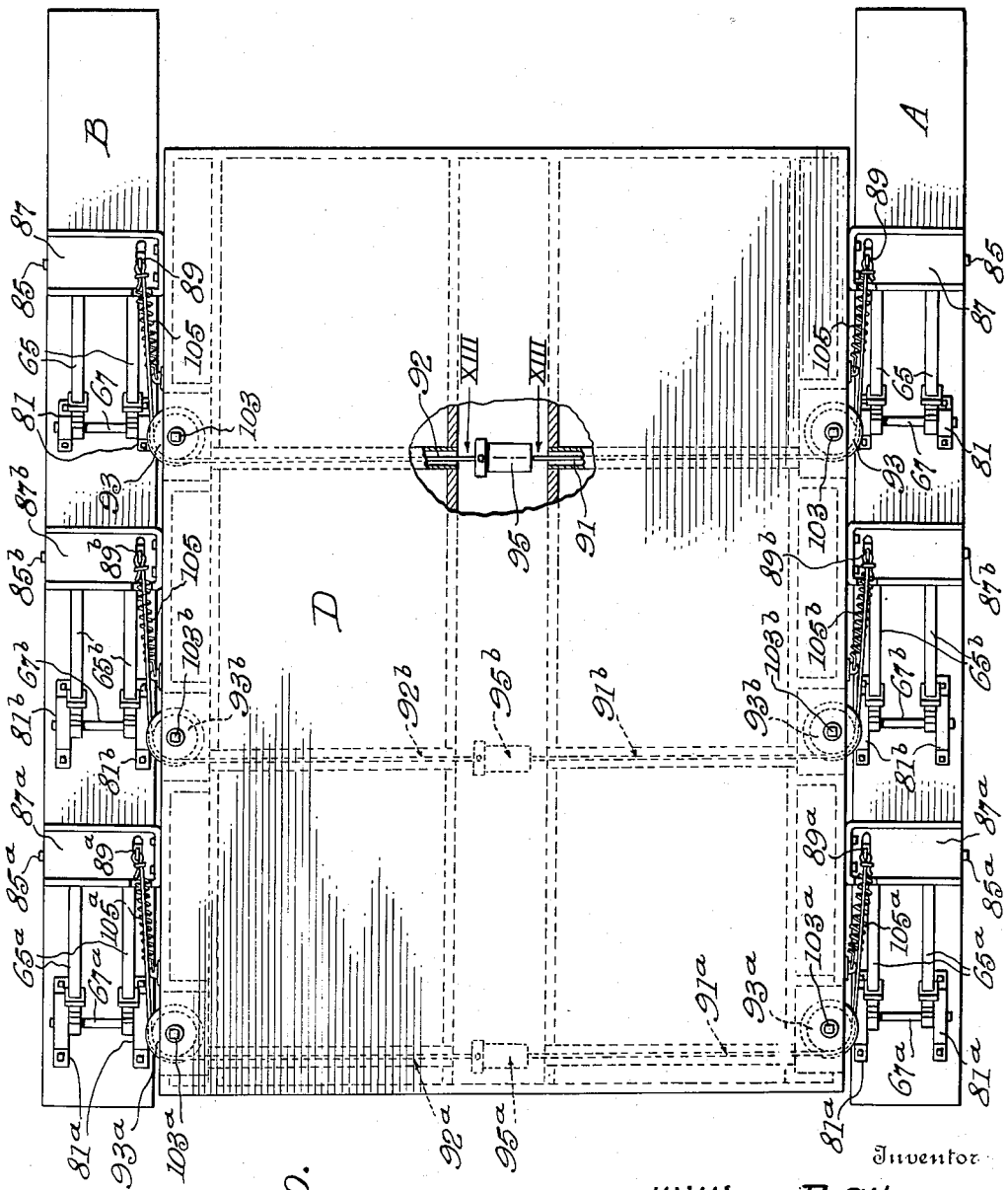

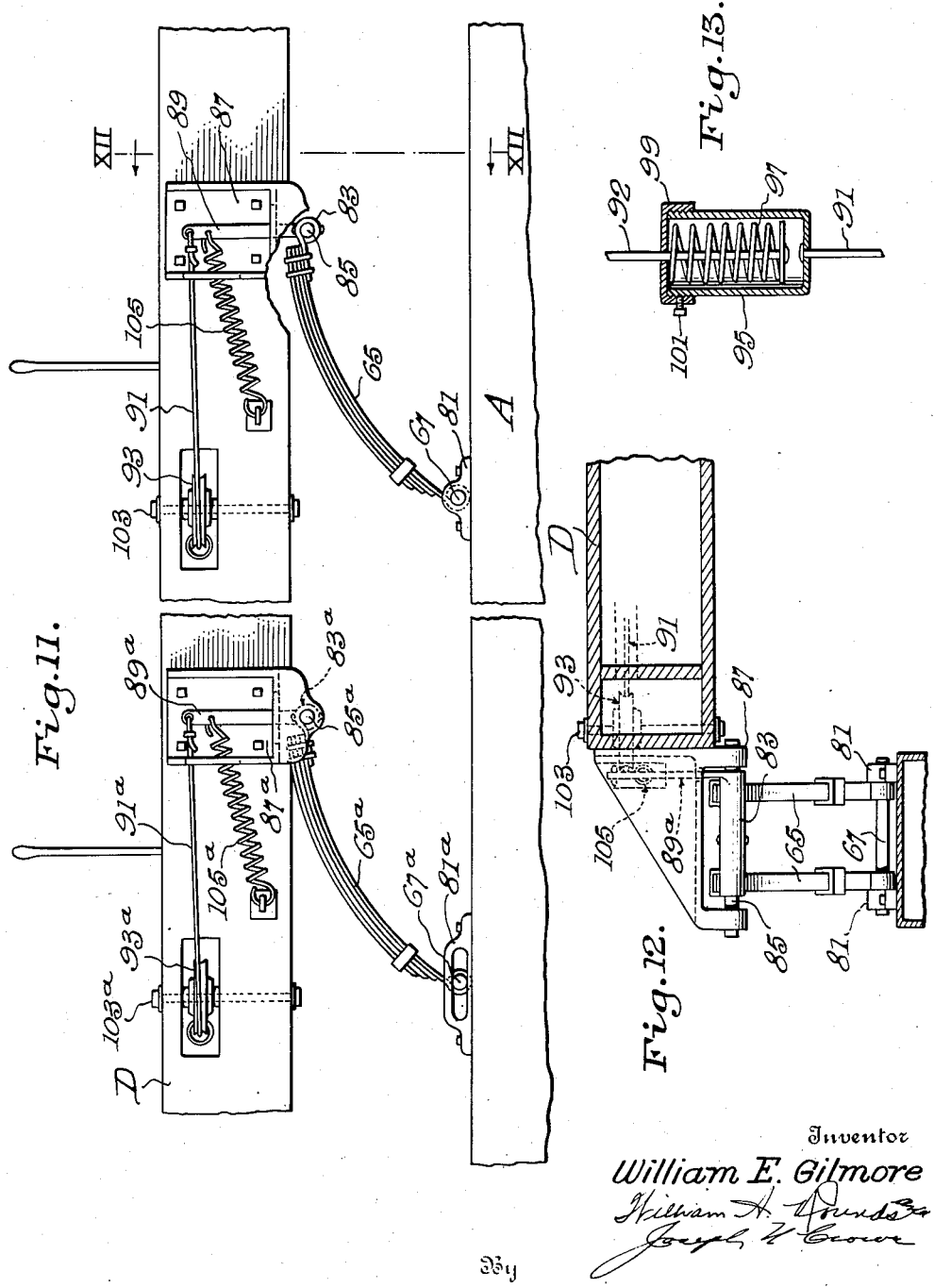

Feb. 5, 1952   W. E. GILMORE   2,584,122
STABILIZING MECHANISM FOR VEHICLES
Filed Sept. 27, 1946   15 Sheets-Sheet 8
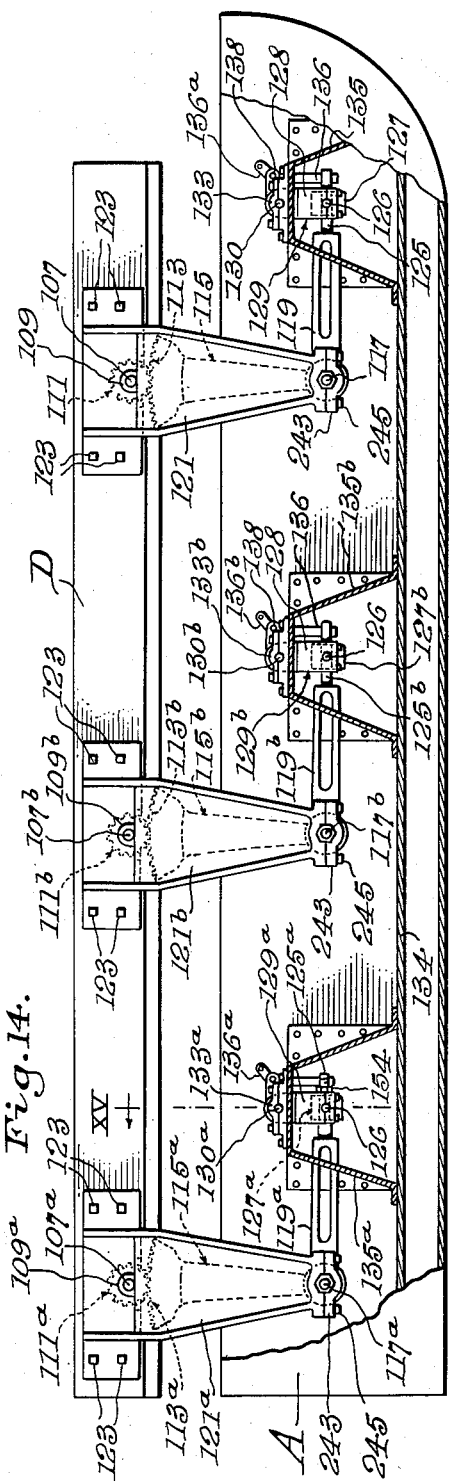
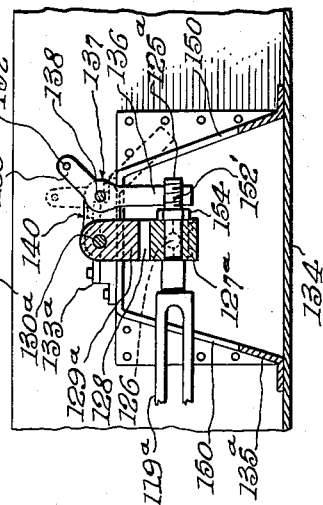
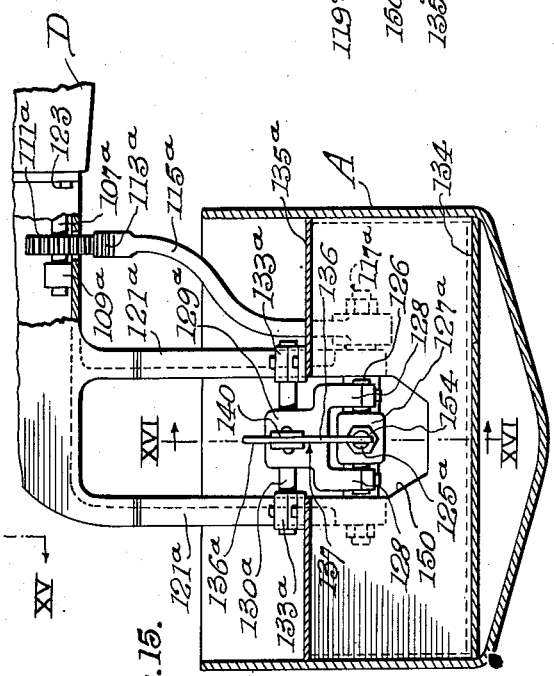
Inventor
William E. Gilmore
Attorneys Feb. 5, 1952   W. E. GILMORE   2,584,122
STABILIZING MECHANISM FOR VEHICLES
Filed Sept. 27, 1946   15 Sheets-Sheet 9
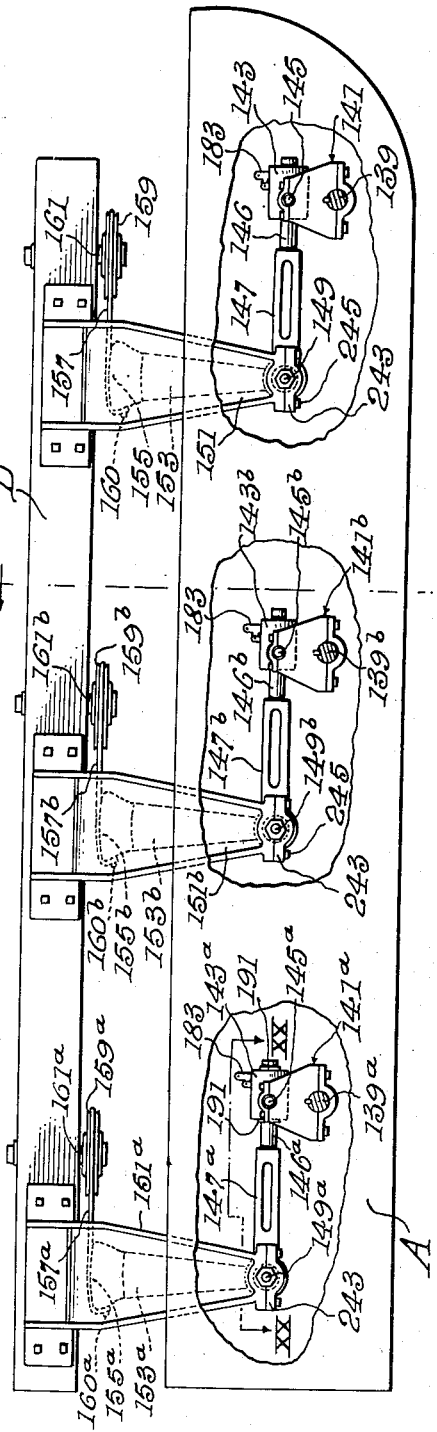
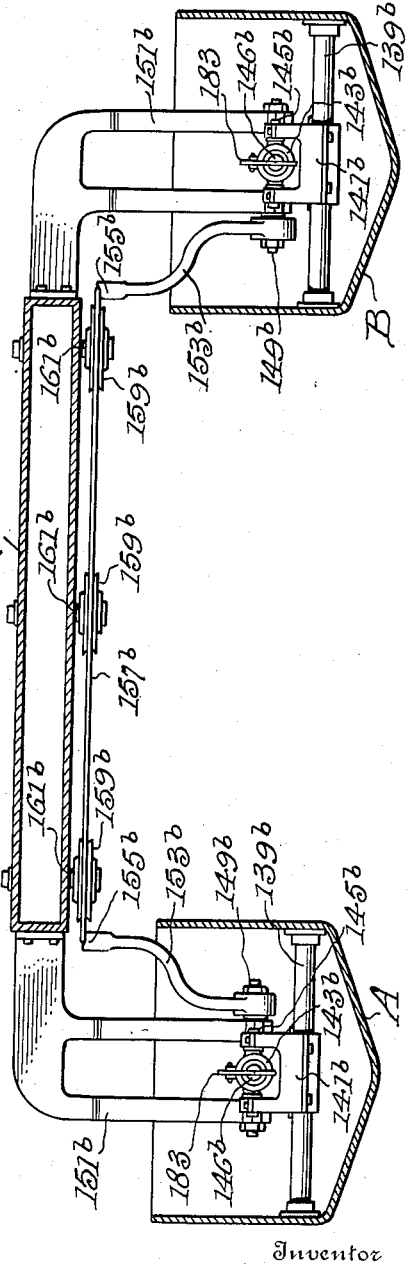
Inventor
William E. Gilmore
By
Attorneys

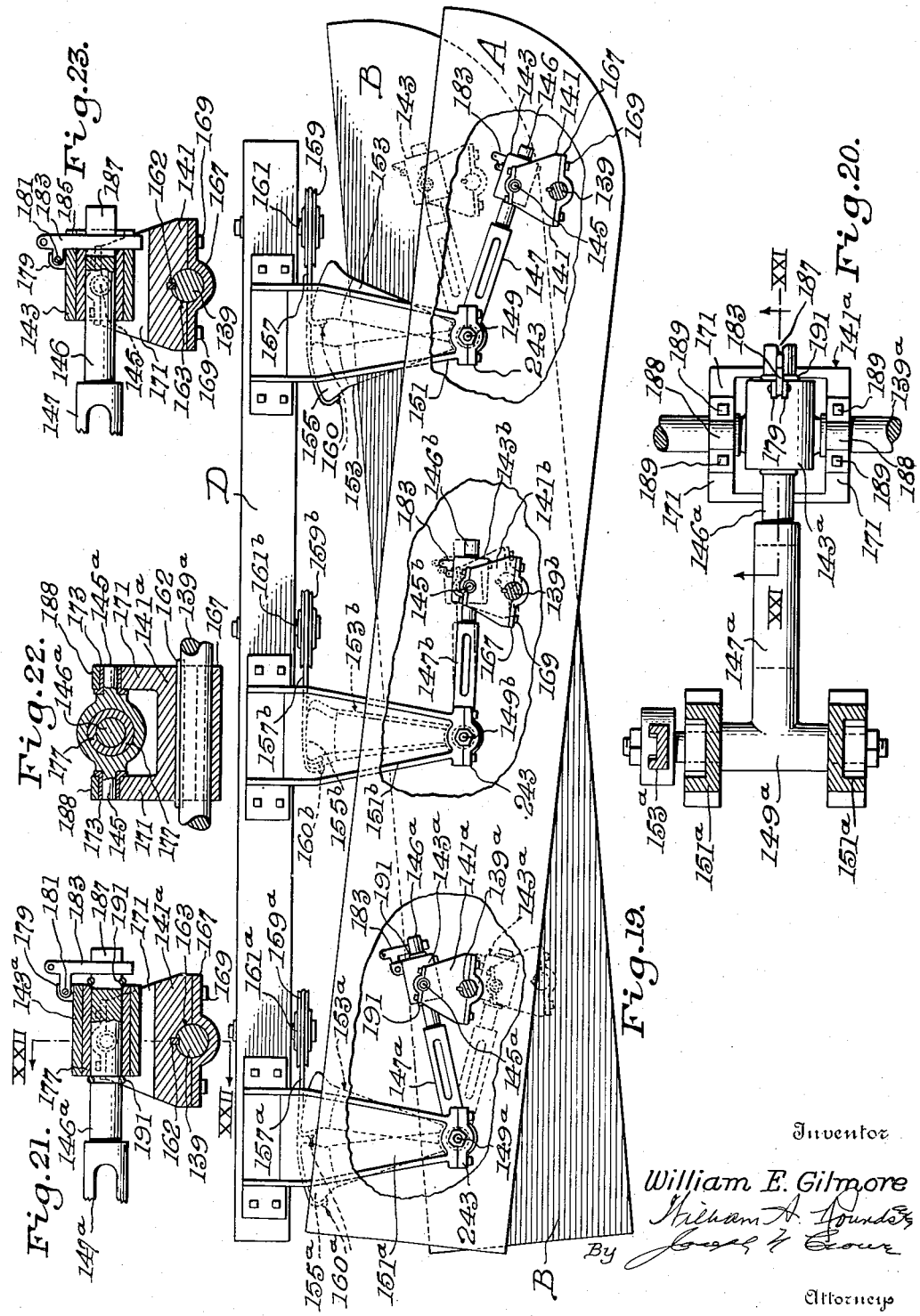

Feb. 5, 1952      W. E. GILMORE      2,584,122
STABILIZING MECHANISM FOR VEHICLES
Filed Sept. 27, 1946      15 Sheets-Sheet 11
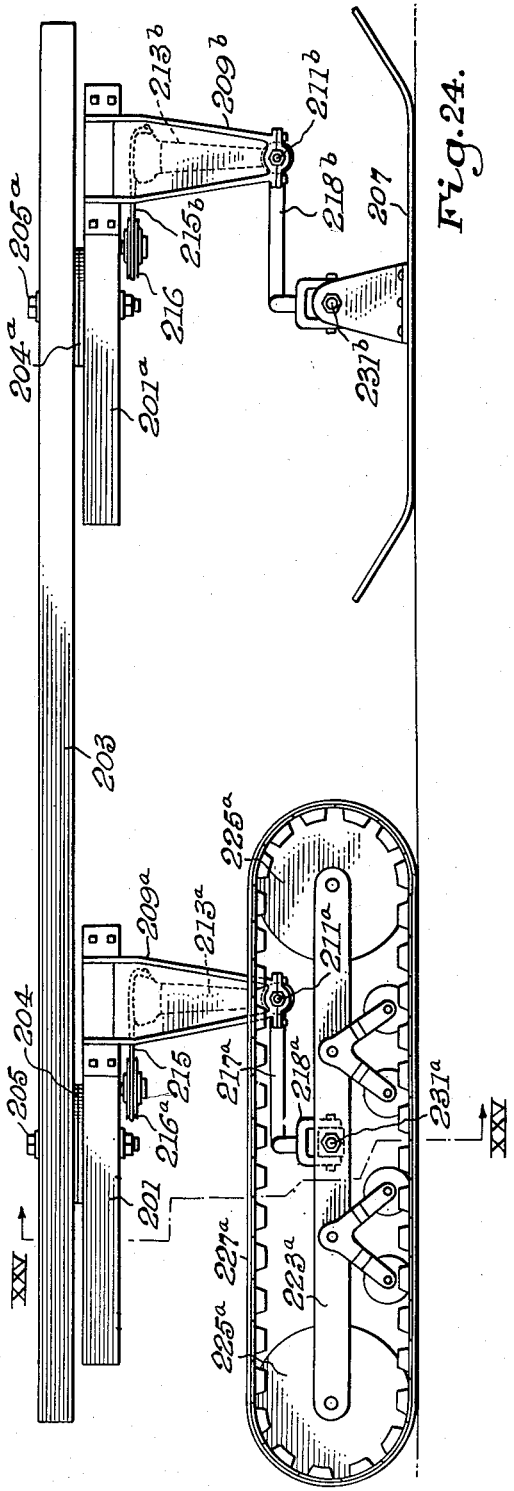
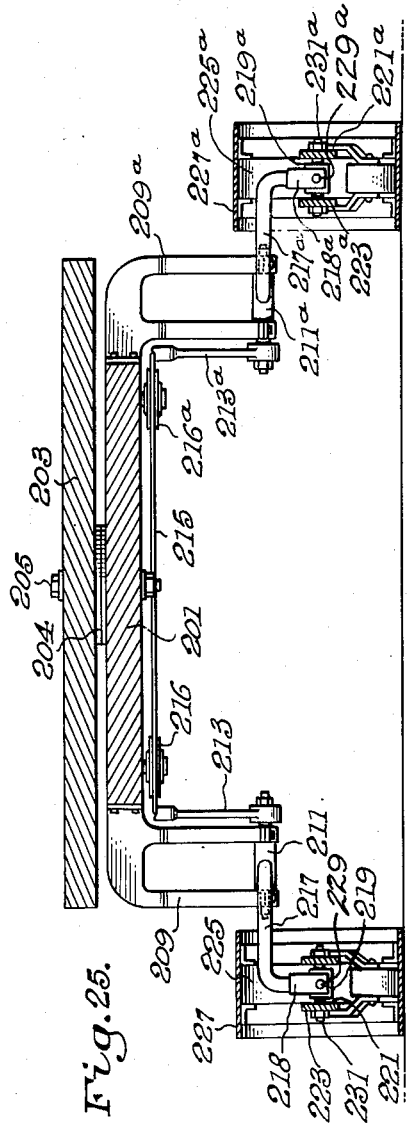
Inventor
William E. Gilmore
Attorneys Feb. 5, 1952 W. E. GILMORE 2,584,122
STABILIZING MECHANISM FOR VEHICLES
Filed Sept. 27, 1946 15 Sheets-Sheet 12

INVENTOR
William E. Gilmore
Attorneys

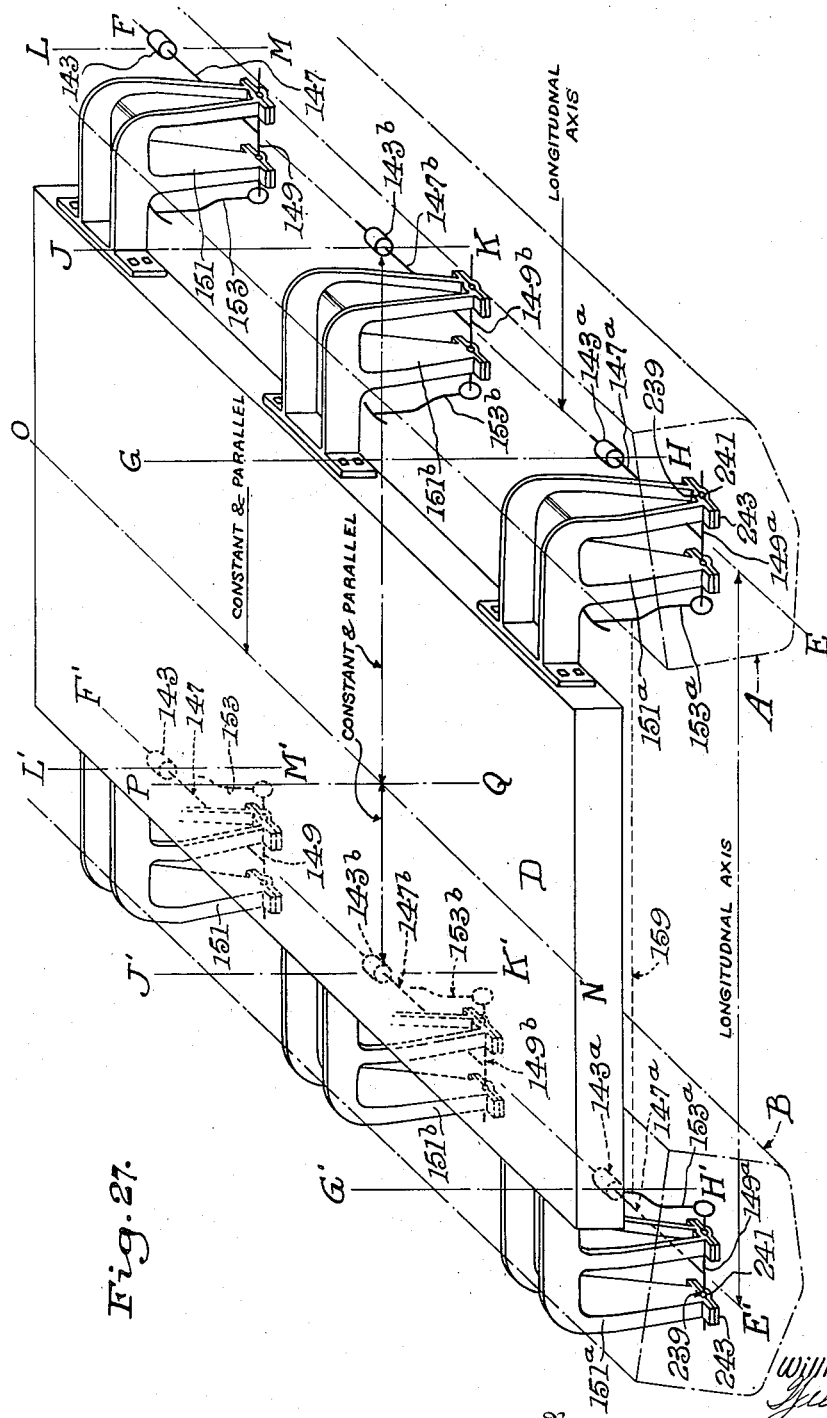

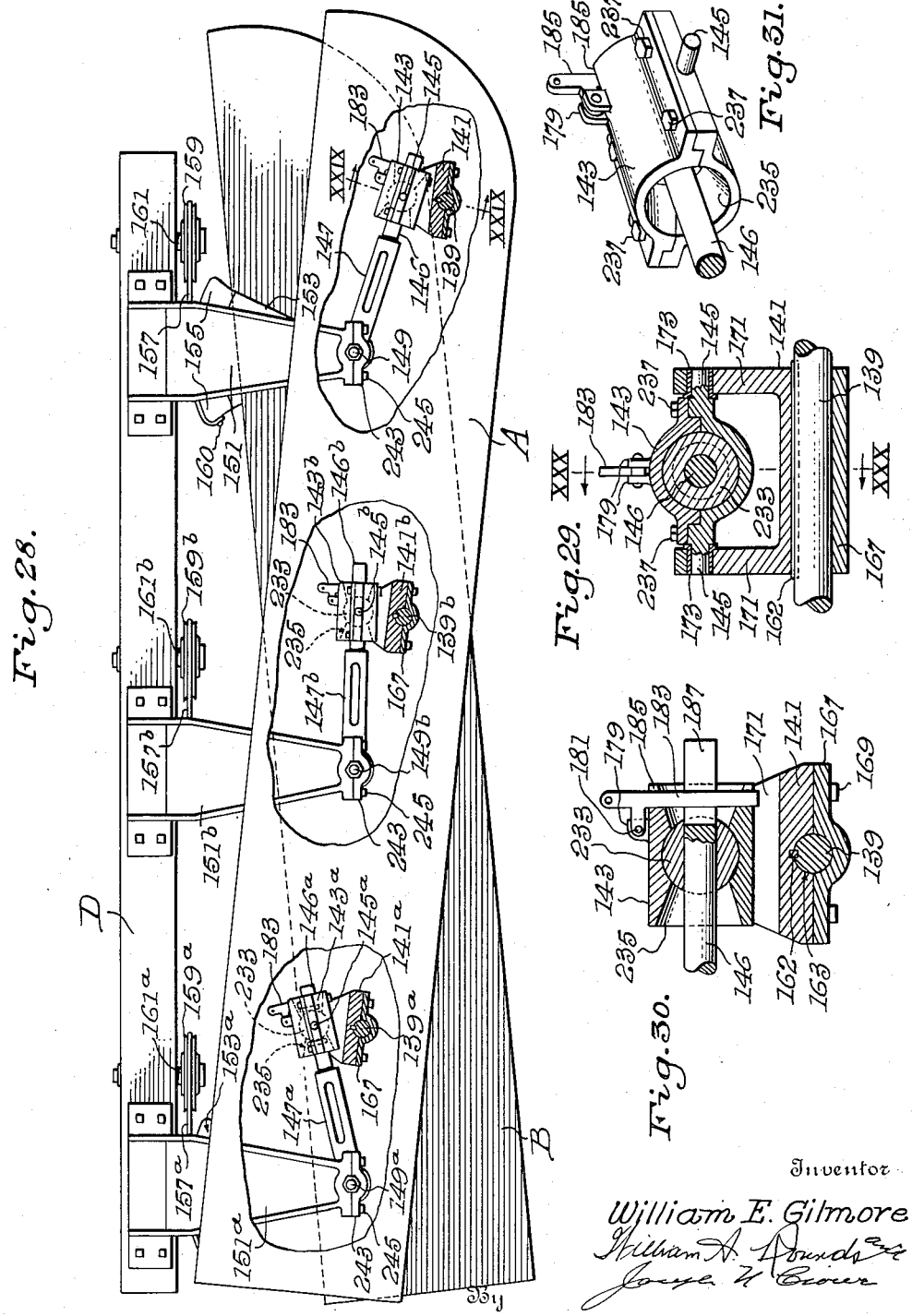

Feb. 5, 1952 W. E. GILMORE 2,584,122
STABILIZING MECHANISM FOR VEHICLES
Filed Sept. 27, 1946 15 Sheets-Sheet 15
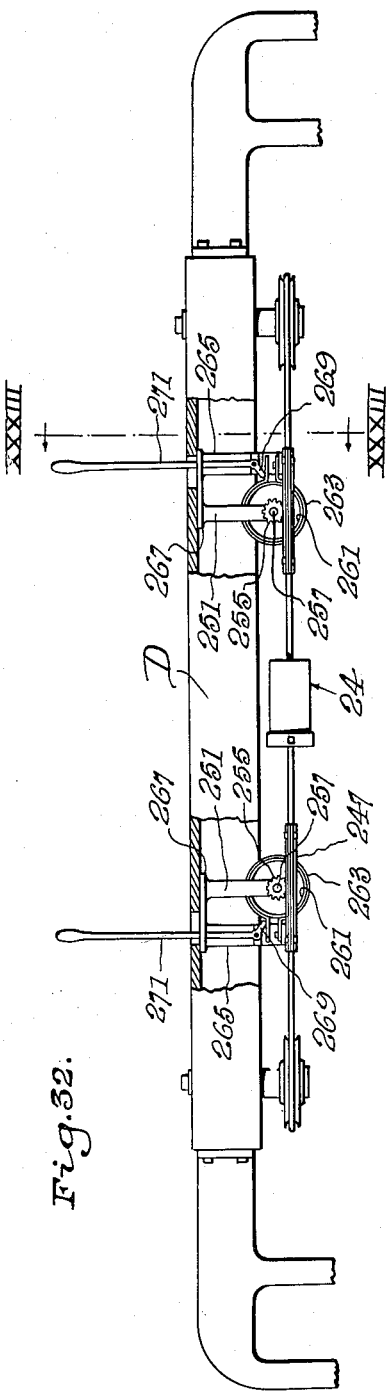
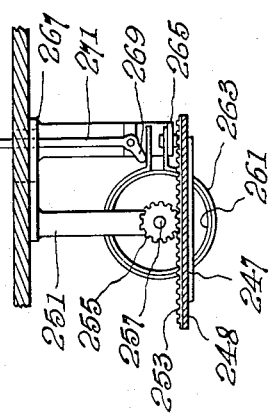
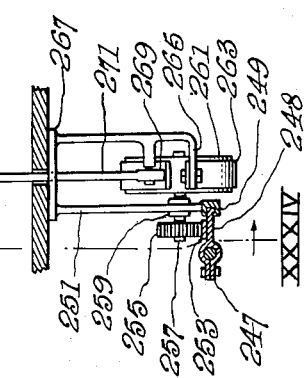
Inventor
William E. Gilmore
By
Attorneys Patented Feb. 5, 1952

2,584,122

UNITED STATES PATENT OFFICE 2,584,122

STABILIZING MECHANISM FOR VEHICLES

William E. Gilmore, United States Army, Lynnhurst, N. J.

Application September 27, 1946, Serial No. 699,653

17 Claims. (Cl. 114—0.5)

(Granted under the act of March 3, 1883, as amended April 30, 1928; 370 O. G. 757)

The invention described herein may be manufactured and used by or for the Government for governmental purposes, without payment to me of any royalty thereon.

The present invention provides certain improvements in the construction of load-transporting instrumentalities, which improvements may be embodied either in watercraft embodying twin hulls, or as sledges mounted on runners for the transport of loads over ice and snow-covered terrain, or vehicles embodying endless treads. Generally speaking, the invention relates to improved mounting means for a load-carrying superstructure (specifically a platform or similar surface), which mounting means connect the superstructure to the body of the vehicle (whether such be twin hulls of a watercraft or runners for a sledge, or a wheeled chassis) which assures the superstructure remaining substantially level regardless of the position assumed by the mounting means carrying the superstructure, within the limits of operation of the said mounting means.

Generally speaking, the various types of vehicles referred to above are not new. Thus twin-hulled watercraft have been proposed for use in sheltered and comparatively shallow waters, such craft being of much shallower draft, much speedier, and much more maneuverable than are the usual single-hulled vessels. Also, the twin-hulled craft can be shipped "knocked down" so as to occupy the minimum of shipping space. In such structure, when assembled, the load-carrying superstructure spans the twin hulls at least to a substantial extent.

Sledge type vehicles when the load-carrying instrumentalities are secured to twin runner mounts, also obviously are extremely old. But in all types of vehicles, whether they be water or land, a common difficulty is experienced when irregularities or roughness in the medium through or over which the vehicle is traveling are encountered.

This difficulty arises from the fact that in all instances of such prior constructions, the load-carrying superstructure is not mounted with the degree of flexibility required to maintain it substantially horizontal regardless of the position of the mounts (hulls or wheels or runners) relative to each other. In the event of watercraft, the effects of wave motions on the hulls are to set up torsions in many directions, which, if the elastic limit of the materials used in the construction of the vessels is exceeded, will cause inevitable fracture of the hulls or superstructure; but in any case, there will be variations in the load-carrying superstructure away from the horizontal, and loss of steerage way due to broadside draft of the hulls. Similar effects are noted for land vehicles traveling over irregular terrain.

The present invention provides an improved articulated mounting for a load-carrying superstructure which maintains a substantially horizontal load-carrying position within the limits of articulation of the mounting means and independent of the motion between mounts for the upper structure.

In the following description and claims, the term "hull" is used generally to include sledge runners and tracks, wheeled frames, and endless tread vehicles, as well as boat hulls.

An object of the present invention is the provision of articulated interconnected mounting means for a load-carrying superstructure which, within the limits of articulation, is constructed and adapted to constantly maintain the superstructure transversely level regardless of unevenness or deviation from horizontal of the surface over which the structure passes.

A further object is the provision of mounting means for a load-carrying superstructure which, within the limits of articulation, is constructed and adapted to substantially reduce the degree of pitch of the superstructure as the structure passes over a surface transversely uneven and at the same time to maintain the structure transversely level.

A further object of the invention is the provision of articulated means for mounting a load-carrying superstructure on carriage means, which is constructed and adapted, within the limits of articulation, to maintain the superstructure substantially horizontal and without the imposition of additional stress on the superstructure as the result of vertical shifting of the carriage means.

A further object is the provision of means for mounting a load-carrying superstructure on carriage means, which permits the employment of one, two, or more mounting means at each side of the superstructure.

A further object is the provision of means for mounting a superstructure on parallel hulls which is constructed and adapted to maintain the longitudinal axes of the hulls continuously equidistant and in parallel planes perpendicular to the plane of the superstructure independently of the movement and position of the hulls.

A further object of the invention is the provision of mounting instrumentalities for a load-carrying superstructure which will maintain the vertical center lines of the hulls at a constant distance from each other independently of the latitude of vertical movement of the respective hulls, or the position of the horizontal axes of the hulls in their relationship to one another.

A further object of the invention is to provide articulated mounting means for the superstructure that will maintain the superstructure substantially horizontal at all times and which will maintain the vertical plane of the athwartship or transverse axes of the hulls constantly at right angles to the horizontal plane of the center line or axis of the superstructure within the limits of articulation of the mounting means during the entire latitude of movement of the respective hulls on their horizontal axes in relationship to the said superstructure.

Further objects of the invention become apparent as the description proceeds and the features of novelty will be pointed out in particularity in the appended claims.

The invention will be understood more readily by reference to the accompanying drawings which represent illustrative embodiments of the invention.

In the drawings:

Figure 1 represents a side elevation of a twin-hulled water-borne craft embodying the features of the invention;

Figure 2 is a transverse sectional elevation taken on the line II—II of Figure 1;

Figure 3 is a view similar to Figure 1 showing the horizontal maintenance of the load-carrying superstructure in horizontal position regardless of relative displacement of the hulls, within the limits of articulation of the mounting means for the superstructure;

Figure 4 is a segmentary sectional plan view of a portion of an enlarged scale, the view being taken between the planes of the lines IV—IV of Figure 6 looking in the direction of the arrows;

Figure 5 is a transverse elevation taken on the line V—V of Figure 4;

Figure 7 is a side elevation similar to Figure 1 but illustrating a modification of the construction of Figure 1;

Figure 8 is a transverse elevation partly in section of the embodiment shown in Figure 7;

Figure 9 is a plan view of the modification of Figure 7, parts being broken away to show structural features;

Figure 9A is a sectional elevation of braking mechanism employed in conjunction with the motion-transmitting gearing of Figure 9, taken on the line IXA—IXA of Figure 9;

Figure 10 is a plan view similar to Figure 9 but showing a further modification;

Figure 11 is a fragmentary side elevation of a portion of Figure 10, parts being broken away;

Figure 12 is a transverse sectional view taken on the plane of the line XII—XII of Figure 11, looking in the direction of the arrows;

Figure 13 is a detail sectional view taken on the line XIII—XIII of Figure 10;

Figure 14 is a fragmentary side elevation of further modification, parts being broken away to show structural features;

Figure 15 is a sectional elevation through one of the supporting mechanisms of Figure 14, the view being taken along the line XV—XV of Figure 14, looking in the direction of the arrows;

Figure 16 is a sectional elevation showing structural details of the mechanism of Figure 15, the view being taken on the line XVI—XVI of Figure 15;

Figure 17 is a side elevation of a further modification of the invention;

Figure 18 is a sectional elevation of the modification of Figure 18, the view being on the line XVIII—XVIII of Figure 17;

Figure 19 is a view similar to Figure 17, but showing the relative position of the parts during vertical angular displacement of the hulls or carriage means;

Figure 20 is a horizontal sectional plan view of one of the mounting assemblies, namely, the left-hand assembly as viewed in Figure 17, for the leveling mechanism, the view being taken on the line XX—XX of Figure 17, looking in the direction of the arrows;

Figure 21 is a vertical sectional elevation taken on the line XXI—XXI of Figure 20, looking in the direction of the arrows;

Figure 22 is a transverse sectional elevation taken on the line XXII—XXII of Figure 21, looking in the direction of the arrows;

Figure 23 is a view similar to Figure 21, but showing the construction of the remaining mounting assemblies of Figure 17;

Figure 24 is a side elevation of the invention adapted to a motor-driven vehicle, specifically a sledge provided with runners and an endless tread mechanism;

Figure 25 is a transverse sectional elevation of the mechanism of Figure 24, the view being taken on the line XXV—XXV of Figure 24;

Figure 27 is a view similar to Figure 26 illustrating the constancy of the relations shown in Figure 26 under conditions of displacement of the mounting means for the superstructure, the view showing relative lateral displacement of the hulls;

Figure 28 is a view similar to Figure 19, but showing a modified form of hulls or mounting means;

Figure 29 is a transverse sectional elevation through the modified mounting means of Figure 28, the view being taken on the line XXIX—XXIX of Figure 28;

Figure 30 is a longitudinal sectional elevation of the mounting of Figure 29, the view being taken on the line XXX—XXX of Figure 29, looking in the direction of the arrows;

Figure 31 is a perspective view of a portion of the mounting means shown in Figures 28, 29 and 30;

Figure 32 is a fragmentary sectional elevational view corresponding to the structure shown in the upper portion of Figure 18, the view showing application of locking instrumentalities to the motion-transmitting cable for enabling locking of the cable and load-carrying superstructure in any desired position;

Figure 33 is a sectional elevational view taken on the line XXXIII—XXXIII of Figure 32, looking in the direction of the arrows; and Figure 34 is a vertical section taken on the line XXXIV—XXXIV of Figure 33, looking in the direction of the arrows.

Figure 6:
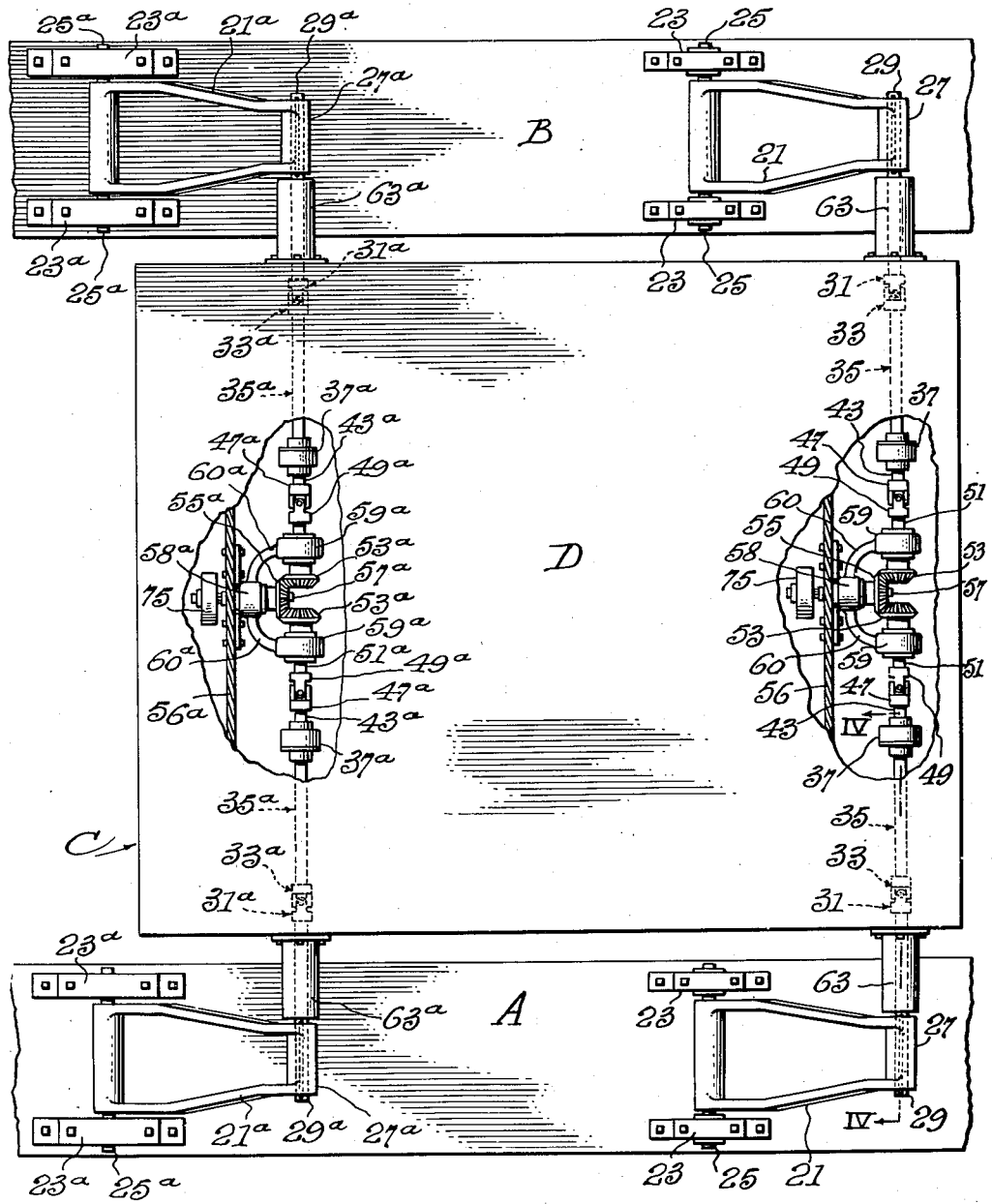
Figure 6 is a plan view of one form of the invention, parts being broken away to show structural features.

Referring more particularly to the drawings and first to Figures 1 and 2, reference characters A and B represent twin mounts or hulls for a load-transporting superstructure C which comprises the platform D. The superstructure C in these views may be hollow to contain equalizing mechanism which will be described in detail hereinafter.

Mounted on each of the hulls A and B are similar fore and aft arm brackets 21 and 21a that are pivotally mounted in bearings 23 and 23a mounted on the top of the hulls A and B, the pivotal connection being through trunnions 25 and 25a that extend laterally in these bearings 23 and 23a. Bearings 23 are rigidly fixed bearings while bearings 23a permit trunnions 25a and arms 21a to slide to accommodate changes in center due to variations in relative positions between the hulls A and B, such as is shown in Figure 3 for example.

The upper portion of each bracket arm 21 and 21a forms sleeves 27 and 27a which sleeves are keyed to the similar shafts 29 and 29a which extend as shown into the interior of the superstructure.

The shafts 29 and 29a are provided on their inner ends with a universal coupling yoke or shackle, such as indicated at 31. These yokes are pin-connected to complementary universal coupling members 33 on the outer end of each shaft 35. Each of the shafts 35 extends inwardly and terminates in a housing 37, a plurality of radial vanes 39 (see Figures 4 and 5) which terminate just short of the housing 37, as is indicated on Figure 5 on an enlarged scale, extending diametrically from the shaft 35. Projecting inwardly from housings 37 are radial vanes 41, these vanes 41 alternating with the vanes 39 on shaft 35. Housings 37 fit loosely over shafts 35 to permit independent rotation of the shafts 35 relative to the housings.

Keyed to the housings 37 for conjoint rotation therewith are shafts 43, and between the vanes 39 and 41 in the housings 37 are a plurality of coil springs 45 sufficiently compressed to be retained frictionally between the vanes and on retaining lugs 39a for a purpose to be described hereinafter. The shafts 43 are only long enough to be keyed to housings 37 and to terminate in universal coupling members 47 which are coupled with universal coupling yokes 49 of shafts 51. These shafts 51 terminate in bevel gears 53 that mesh with other gears 55 carried on stub shaft 57 that is mounted on the forward transverse reinforcing beam 56 of superstructure D in a bearing the housing for which is shown at 58. The shafts 51 turn in anti-friction bearings in housings 59, these housings being mounted on bracket arms 60 which extend as shown from bearing-housing 58, and which are secured to this bearing housing; and suitable anti-friction bearings, indicated at 61, are provided for shafts 29. Bearings 61 are housed in cylindrical housing 63.

It will be seen, therefore, that if there is a vertical displacement between the hulls A and B (such as is indicated in Figure 3 by way of illustrative example), the forward pair of arms 21 freely pivot in bearings 23 and whatever may be the relative movement between the hulls, approximately equal and opposite movement will be transmitted through the transmission mechanism and universal couplings described above, thereby maintaining the superstructure in a substantially horizontal plane transversely of the hulls.

At the same time, the aft pair of arms 21a is functioning in a similar manner through an identical transmission system as that described above, like parts of which are designated by the same reference numbers as used above with the addition of the letter "a" to each number. Simultaneously, however, the bracket arms 21a are free to slide in bearings 23a, and do slide into opposite positions as indicated in Figure 3, automatically compensating for differences in vertical displacement between the hulls A and B and maintaining the superstructure D continuously in an approximately horizontal plane longitudinally, regardless of the displacement between the hulls, up to the limits of articulation of the connecting linkage between the respective hulls and the superstructure permitted by the length of the pivot arms and the amount of sliding movement permitted by bearings 23a.

It has been stated that movement of one of the hulls A or B relative to the other transmits approximately equal and opposite movement to the other hull. This is accomplished smoothly and evenly through the action of the coil springs in the housings 37 and 37a. The transmission gearing effects rotation of the shafts 43 and 43a thus shifting the housings 37 and 37a and effecting a greater or less compression of springs 45, depending upon the amount of relative movement between the hulls. The resulting compression of the springs 45 acts on vanes 39 to turn shafts 35 and 35a, and if the springs 45 are compressed to their full extent, shafts 43 and 35 turn together as a unit.

The modification shown in Figures 7, 8 and 9 acts in a similar manner except that superstructure D is mounted on three mounting members instead of the two supports described in the foregoing description of Figures 1 through 6, and the mounting members are pairs of springs 65, 65a and 65b, that are mounted on the top of hulls A and B through pivotal pin connections 67, 67a and 67b, around which the springs are free to pivot vertically. The upper ends of the springs are secured to sleeves 69, 69a and 69b that are mounted in end brackets 71, 71a and 71b on the sides of superstructure D. Sleeves 69, 69a and 69b are keyed to shafts 73, 73a and 73b that correspond to shafts 29 of the previously described construction. Movement is transmitted through universal couplings, shafts and transmission gearing instrumentalities identical to those described above, the parts of which are identified with the same reference numerals as applied to the construction of Figures 1 through 6, except that the letter "b" is applied to the numerals of the intermediate transmission elements of Figures 7, 8 and 9, and require no further description.

It will be noted in the construction of Figures 7, 8 and 9 that an optional provision is included, in that braking means may be provided for restraining idler gears 55, 55a and 55b of the motion transmission mechanism against rotation, thereby locking the mechanism into what amounts to a unitary construction.

This mechanism comprises usual braking instrumentalities such as a brake drum 75, a brake band 77 cooperating therewith, and a brake-actuating lever 79, for compressing the brake band 77 against the brake drum 75. This brake mechanism locks the entire assembly into a rigid structure. Individual brake levers may be provided for each transmission system, or the braking mechanism may be interconnected and operated simultaneously from a single station.

It will be noted further that pivot 67 for springs 65 is a fixed pivot point in brackets 81, whereas trunnions 67a and 67b are slidable in bearing brackets 81a and 81b as shown so as to maintain proper relationship between vertical and transverse axes, as will be pointed out in greater particularity hereinafter.

In all instances, it is necessary to have one of the connections for the levers as a fixed pivot, the remaining levers being slidably mounted in their bearing brackets. In operation each pair of the springs and the keyed sleeves 69, 69a and 69b function as integral units.

In the modification of the construction shown in Figures 10, 11 and 12, means are provided for resisting tilting if the said superstructure is loaded unevenly. While the modified construction of Figures 10, 11 and 12 is shown in conjunction with a spring mounting similar to that of Figures 7, 8 and 9, it will be understood that the embodiments of the construction of Figures 10, 11 and 12 are of general application and may be used in connection with any of the illustrated embodiments.

Springs 65 and 65a are mounted as previously described on pivot trunnions 67 and 67a, respectively, which are mounted in fixed bearings 81 and sliding bearings 81a, respectively. Springs 65 and 65a are attached integrally to sleeves 83 and 83a, keyed to shafts 85 and 85a mounted in brackets 87, 87a of the superstructure D. Also integral with the sleeves 83 and 83a are levers 89 and 89a, cables 91 and 92 being attached to the upper ends of levers 89 and passing around opposite pairs of sheaves 93 and 93a in the superstructure which is recessed to provide mounting space for the sheaves 93 and 93a and also for the passage of the cables. Cable 91 is attached to the end of a cylindrical housing 95 which contains a spring 97 under compression between the end of the housing and the cap 99 of the housing, which cap has a hole therethrough for passage of cable 92. Cable 92 is attached to the inner end of spring 97 in any suitable manner. Cable 92 passes around its sheave 93 and is attached to the upper end of the lever 89. Cap 99 of the housing 95 is held in place by a set screw 101. Sheaves 93 are mounted on shafts 103 for free rotation of the sheaves. Springs 105 also are attached to levers 89 and to the superstructure D, which springs resiliently hold the levers 89 in upright position and resist turning movements of the levers responsively to uneven loading of the superstructure, thereby inhibiting tilting of the said superstructure if the load is unevenly placed thereon.

This construction is repeated for each of the mountings. These levers 89a for the mountings 65a are held by cables 91a and 92a passing around sheaves 93a; and springs 105a exert a snubbing action on the superstructure as defined above, cooperating with springs 105 to inhibit tilting of the superstructure.

In this modification, a third transmission and snubbing system is provided, which is entirely similar to the systems described above, and the parts of which are indicated by the same reference numbers, except for the letter "b" applied to each of the said reference numbers. This third transmission and snubbing system is located equidistantly between the other two and intermediate thereof. The mounting brackets 81, 81a and 81b are shown as being mounted on the gunwhales of the hulls A and B, the pivotal connections 67 being fixed connections, while the pivotal connections 67a and 67b are slidable in brackets 81a and 81b.

In the modification shown in Figures 14, 15 and 16, the cables and sheaves of the modification, just described above, are replaced by shaft and gear-transmission mechanism like that shown in Figure 9. Thus, shafts 107, 107a and 107b are shown as being mounted in bearings 109, 109a and 109b. These shafts carry end pinions 111, 111a and 111b that engage segmental racks 113, 113a and 113b on lever arms 115, 115a and 115b. These lever arms are mounted on stub shafts 117, 117a and 117b, to which shaft additional lever arms 119, 119a and 119b are rigidly attached. These shafts are rotatably mounted in the lower part of brackets 121, 121a and 121b that are connected rigidly to the superstructure D by rivets, bolts or equivalent attachment devices 123.

Lever arms 119, 119a and 119b are provided with reduced end portions 125, 125a and 125b that project into trunnion blocks 127, 127a and 127b, these trunnion blocks having oppositely extending trunnions 126 that are carried in the side arms 128 of shackles or pillow blocks 129, 129a and 129b. These pillow blocks also are pivoted on shafts 130, 130a and 130b that are held in bearings 133, 133a and 133b that are mounted on the top of housings 135, 135a and 135b. These housings are shown as being mounted on the bottom 134 of the hulls.

The trunnions 126 of each of the trunnion blocks 127, 127a and 127b constitute the only connections between the superstructure D and the hulls A and B, the hulls A and B therefore being free to roll laterally about the lever arm portions 125, 125a and 125b in the trunnion blocks, this rolling movement therefore not being transmitted to the lever arms 119, 119a and 119b, so that the horizontal transverse plane of the superstructure D remains unaffected by such transverse rolling movement of the hulls.

Where the hulls become displaced longitudinally in a pitching motion, as illustrated in Figure 19 for example, lever arm 119a (Fig. 14) is held against sliding movement in its trunnion block, it being held rigidly against such movement by mechanical locking means, while lever arms 119 and 119b are free to slide in their respective trunnion blocks. Any relative longitudinal displacement between the hulls will be transmitted in an opposite and equal direction through the rack and pinion connections between the hulls and superstructure and the connecting parts.

In the form shown in Figures 17 and 18 the same function is performed by the connecting cables. It will be understood that the shock-absorbing mechanism shown in connection with the construction of Figure 10 may be incorporated in similar manner in all modifications.

Locking mechanism, shown in Figs. 14, 15 and 16, and which will be described in more particularity hereinafter, may be provided to lock the mechanism for producing integral movement between the hulls in the event of lateral rolling motion.

The locking mechanism referred to above comprises an arm 136 of a bell crank 137, the arm 136 being the longer arm of the bell crank, the bell crank being fulcrumed at 138 on a pin which extends through the sides of a bracket 140 that projects from the pillow blocks 129, 129a and 129b.

The end of each of the lever arm portions 125, 125a and 125b which pass through each trunnion block is recessed for the reception of the arm 136 of bell crank 137. Engagement of the arm 136 in this recess locks the said lever portions and therefore lever arms 119, 119a and 119b thereby preventing relative rolling motion between the hulls A and B. The short arm 136a of the bell crank 137 is provided with an eye 152 for the reception of a cable and other means, not shown, for actuating the bell crank 137 so that the arm 136 may be moved between locking and releasing positions. It will be observed that the shaft portion 125a is threaded as is indicated at 152', a nut 154 being mounted on these threads and brought into engagement with the trunnion block 127a thereby preventing displacement of the lever arm from the trunnion block 127a. Housings 135, 135a and 135b are provided with registering openings 150 to accommodate the lever arms and locking mechanisms.

When the arm 136 is in locking position, the hulls A and B will be held together laterally as by a rigid connection, although longitudinal vertical displacement between the hulls is still possible through the action of the pinions 111 on the segments of levers 115. The above construction is duplicated for each of the mountings for the superstructure, as will be apparent from Fig. 14. It will be apparent that the hulls may be permitted to roll laterally about the lever arm portions in the trunnion bearings, or may be locked by the means described, if desired.

The superstructure D is maintained substantially horizontal within the limits of articulation of the mounting means for the superstructure by the above construction in a manner similar to that described above. This modification, however, has the additional advantage of eliminating any tendency of relative longitudinal displacement between the hulls, and maintains the hulls A and B continuously in the same relative position to each other, while also automatically maintaining the superstructure D continuously in a substantially horizontal plane within the limits of articulation of the mounting means for the superstructure during both vertical and lateral displacements between the hulls incident to pitching and rolling movements of the hulls.

The modification of the construction shown in Figures 17 and 18 offers these same advantages, with an increased flexibility of mounting of the lever assemblies, and eliminates the housings which support and enclose the mounting assemblies in the modifications shown in Figures 14, 15 and 16.

In the modification of the construction shown in Figures 17 and 18, shafts 139, 139a and 139b extend from side to side of each of the respective hulls A and B adjacent to the bottoms thereof, and are secured to the sides of the hull. These shafts are mounted equidistantly from the bottom of the hulls and are in the same horizontal plane extending longitudinally through the hulls when the hulls are at rest.

Mounted on these shafts are pillow blocks 141, 141a and 141b in which are mounted trunnion blocks 143, 143a and 143b, from which extend trunnions 145, 145a and 145b that extend laterally from the trunnion blocks through the arms of the pillow blocks 143, 143a and 143b, the reduced ends 146, 146a and 146b of lever arms 147, 147a and 147b extending into these trunnion blocks, as shown, each of these lever arms being integral with stub shafts 149, 149a and 149b. This construction is the same as the construction of the modification of Figures 14, 15 and 16.

Each of these stub shafts 149, 149a and 149b is carried in brackets 151, 151a and 151b that are secured to the superstructure D and extend into the hulls A and B so that the stub shafts 149, 149a and 149b are on the same horizontal plane passing through the longitudinal center line of the hulls A and B, which plane also includes the trunnions 145, 145a and 145b. The trunnions in each of the hulls A and B remain in this same longitudinal plane through the respective hulls independently of any vertical displacement between the hulls as indicated clearly on Figure 19. The positions of the trunnions on the center line of the hulls is not particularly critical, as they may be equidistantly above or below this center line, although preferably they are on this center line.

The tops of the brackets 151, 151a and 151b are aligned on the sides of the superstructure D so as to maintain the superstructure parallel to, and horizontal with, the hulls both longitudinally and transversely, when the hulls are at rest, and substantially horizontal independently of the position of the hulls, and within the limits of articulation of the mounting means for the superstructure.

Mounted on each of the stub shafts 149, 149a and 149b and movable therewith are levers 153, 153a and 153b, these levers being similarly shaped, as indicated on Figure 18, and similar to the levers 115, 115a and 115b of the modification shown in Figures 14, 15 and 16. However, in the construction of Figures 17 and 18 the enlarged segmented top surfaces 155, 155a and 155b of the levers 153, 153a and 153b receive operating cables 157, 157a and 157b, these cables being secured to the segmental top portions of the levers as indicated at 160, 160a and 160b. These cables 157, 157a and 157b extend beneath the superstructure D as shown in Figure 18, and connect opposite levers of each shaft as shown in Figure 18, the cables being carried by sheaves 159, 159a and 159b which depend from the bottom of the superstructure D and which are turnable on shafts 161, 161a and 161b. The cables carry the weight of the superstructure and are so positioned that the superstructure bears proportionately on the cables for equalizing the weight carried by the cables.

The details of the mountings of the lever arm portions 146, 146a and 146b are shown in Figures 20 through 23, inclusive. This mounting substantially compensates for both longitudinal pitching and transverse rolling of the hulls A and B.

As has been pointed out above, the pillow blocks 141, 141a and 141b are mounted on the shafts 139, 139a and 139b, the pillow blocks being keyed to the shafts by a key indicated at 162 on Figures 21, 22 and 23. The shafts 139, 139a and 139b are rigidly secured to the inner sides of the hulls A and B at an equal distance from the bottom of the hulls and in the same longitudinal plane. Each of these shafts 139, 139a and 139b is received in a similar recess 163 that extends across the bottom of the pillow block, and which forms a seat for the pillow block on the shafts, the key 162 forming the connection. The closure is effected by a complementary bottom closure 167 and is held in place by cap screws 169.

The arm portion 145 is received in a trunnion assembly which is constructed and assembled in the following manner:

It will be observed especially from Figures 21, 22 and 23 that each of the pillow blocks 141, 141a and 141b is a casting having two upstanding lateral bracket arms 171, the intervening space between these side brackets defining the reception space for the trunnion assembly, the brackets 171 being recessed to receive trunnion bushings 173 which are composed of hard, wear-resisting steel. These trunnion bushings receive the trunnions 145, 145a and 145b, which extend laterally from the trunnion blocks 143, 143a and 143b, in which trunnion blocks there is fitted by a sweated fit, hard, wear-resisting bushings 177 through which extend the lever arm portions 146, 146a and 146b. Lever arm portions 146 and 146b are free to move longitudinally in trunnion blocks 143 and 143b, while also permitting relative rotary motion between the lever arm portions 146 and 146b and the trunnion assemblies 143 and 143b.

The trunnion blocks 143, 143a and 143b are provided with upstanding lugs 179 through which passes a bolt 181 that forms a pivot for a locking lever 183. Each of the locking levers 183 is provided for enabling the parts to be interlocked rigidly together against relative rolling or lateral motion whenever desired. This lever 183 fits into a locking recess 185 in the end of the trunnion blocks 143 and 143b and also in a locking recess 187 in the end of the lever arm portions 146, 146a and 146b. When in locking position, lever 183 assumes the position indicated in Figures 21 and 23.

It will be observed, however, that lever arm portion 146a is provided with spaced grooves in which fit locking rings 191, which rings prevent longitudinal movement of the shaft portion 146a, while permitting relative lateral rotary motion between the shaft portion and the trunnion block 143a when the locking arm 183 is released, incident to relative rolling motion between the hulls. Trunnion bushings 173 are held in place by closure caps 188 secured by cap screws 189.

The movement of the mechanism is indicated in Figure 19 which shows the relative positions assumed by the parts when there is a vertical displacement of the hulls A and B, amounting, for example, to approximately ten degrees to each other and to the horizontal axes, that is, a displacement of about ten degrees from the static position shown in Figure 17. In Figure 19 the lever arm portion 146a is fixedly mounted and locked, lever arm portions 146, 146b being free to shift longitudinally relative to their trunnion blocks 143 and 143b.

It has been said that the shafts 139, 139a and 139b are fixed rigidly to the inside walls of the hulls. In practice, the mounting of these shafts in the hulls is somewhat below the longitudinal center line of the hulls, so that when the hulls are at rest the trunnions 145, shaft 149, trunnions 145b, shaft 149b, trunnions 145a and shaft 149a are all in the same horizontal plane, which preferably is coincident with the longitudinal center line of the hulls. However, as has been mentioned above, this plane may lie either above or below the longitudinal center line, but the parts must lie in this plane, which must be parallel to and equidistant from the horizontal plane in which is located the bottom of each of the hulls. When the hulls become displaced from their static position, the positions of these elements shift correspondingly as shown in Figure 19.

Thus, with the hulls in the position shown in Figure 19, with the bow of hull A depressed and the stern raised to a position of approximately ten degrees from the static position of Figure 17, trunnions 145, being fixed relatively to the keel of the hull, will be in a downward position, the starboard lever 153 will be moved correspondingly downwardly in clockwise direction, the cable being correspondingly pulled by the starboard lever 153 as this lever assumes the right-hand position shown in Figure 19, the cable 157 transmitting equal and opposite movement to the port lever 153 as indicated in Figure 19, and lifting the base of hull B correspondingly while depressing the stern of hull B in equal amount.

The displacement of the middle levers 153b is much less, these being nearer the center of rotation. The displacement of levers 153, 147, 153b and 147b is in the same direction, and the lever arm portions 146 and 146b slide in their trunnion assemblies, which also pivot on trunnions 145 and 145b to permit the action of the levers.

In Figures 17 and 19 the stern assembly is locked against longitudinal movement, lever arm portion 146a being locked in its trunnion assembly by operation of the locking lever on the assembly and the provision of locking rings, as described above. However, during relative longitudinal and vertical displacement of the hulls, displacement of the levers 153a is in the direction opposite to the displacement of the levers 153 since as the bow of the hull A drops, the stern rises. The superstructure D is maintained substantially horizontally in all directions by the above construction within the limits of articulation thereof, in a manner that will be clearly understood.

While the various embodiments of the invention have been shown above in conjunction with marine vessels, the construction of the invention is not so limited, and the invention actually is of more general application, and, as has been indicated above, the specifically illustrated hulls A and B may be replaced by other carriage members, such as sled runners, endless track vehicles, wheeled vehicles, airplane floats, and the like, the invention being applicable generally to any embodiment wherein it is desired to maintain a superstructure, deck, or load-carrying platform, automatically and continuously horizontal, regardless of wave motion or irregularities in terrain over which the vehicle may be traveling.

Figures 24 and 25 show the embodiment of the invention to a sledge-type vehicle, the views showing the adaptation of the invention to both sled runners, and to endless track construction, these features being combined in the single illustrated embodiment, as will become apparent from the drawings.

Figures 24 and 25 show the system of the present invention applied to a sledge-type vehicle, the views illustrating an embodiment of the invention in an endless tread mechanism, and also as applied to sled runners, as pointed out above.

In Figures 24 and 25, fifth-wheel under carriages 201 and 201a are pivotally mounted to the superstructure 203, which is to be maintained continuously level. The pivotal fifth-wheel connections for the undercarriages are indicated at 204, 204a and the pivotal kingpins therefor are shown at 205 and 205a. The undercarriage 201 connects the superstructure 203 with the endless tread mechanism for the sledge, and the undercarriage 201a connects the superstructure with the runners, one of which is indicated at 207, it being understood that this runner and the associated mechanism are duplicated on both sides of the vehicles, and that the mechanism for the runners 207 is a substantial duplicate of the mechanism for the endless treads. Consequently, only the latter will be described in detail. The endless treads and the runners in the illustrated embodiment of the invention shown in Figures 24 and 25, replace the previously described hulls A and B as mounts for the superstructure, the embodiment of the invention shown in Figures 24 and 25 being designed to maintain the load-carrying superstructure automatically and continuously substantially horizontal, within the limitations of articulation of the mounting mechanism for the superstructure in all directions regardless of irregularities and unevenness of the terrain over which the vehicle is traveling.

The undercarriage 201 has mounted thereon similar bracket arms 209 and 209a, which are similar to the bracket arms described in connection with the precedingly described embodiments of the invention, and which correspond thereto in their functions. For example, these bracket arms 209 and 209a are similar to bracket arms 151, 151a and 151b. These bracket arms 209 and 209a depend from the fifth wheel 201, and carry corresponding shafts 211 and 211a, that have secured to them levers 213 and 213a, which levers effect a turning movement of the shafts 211 and 211a responsively to relative displacements between the treads.

These levers 213 and 213a are similar in construction to previously described levers, such as levers 153, and 153a and 153b, being generally segmental in shape with the arc of the segment at the top receiving an operating cable 215, which is secured to the levers 213 and 213a, as shown, and pass over guiding and supporting sheaves 216 and 216a that are mounted turnably on the undercarriage 201 on the under side thereof.

Levers 213 and 213a are connected through the shafts 211 and 211a to levers 217 and 217a, that function similarly to levers 147, 147a and 147b, that have been described previously. The levers 217 and 217a are connected through universally mounted shackles or pillow blocks 218 and 218a to trunnion blocks 219 and 219a, through trunnions 221 and 221a. The trunnion blocks are mounted and secured in connecting beams 223 and 223a for the wheels 225 and 225a of the endless treads 227 and 227a. Pivotal pin connections between the pillow blocks 218 and 218a and the trunnion blocks 219 and 219a are indicated at 229 and 229a. The trunnion bearings of this modification are shown at 231 and 231a, these being in the connection beams 223, 223a, and when the treads 227, 227a are in horizontal position, the trunnion bearings 231 and 231a are in a plane that is horizontal to the ground, and are equidistant from the ground. This same horizontal plane includes also the trunnion bearings for the runner construction, which now will be described.

From the fifth-wheel undercarriage 201a there are dependent brackets similar to brackets 209 and 209a, only one of which brackets, indicated at 209b, is shown. Bracket 209b and its corresponding bracket hold shaft 211b, similar to shafts 211 and 211a. Lever 213b similar to levers 213 and 213a, together with a corresponding opposite lever, not shown, is mounted on the shaft 211b, and receives cable 215b that passes around the guide sheaves 216b, turnably mounted on the under side of the fifth wheel 201a. The cable 215b is second to the lever 213b as indicated on Figure 24. Shaft 211b also carries levers 217b which are connected in a manner entirely similar to that described above to a trunnion block, one dicated at 231b. This construction is entirely similar to that described in connection with the endless treads, and need not be referred to in any greater detail. Trunnion bearings 231b are in the same horizontal plane as trunnion bearings 231 and 231a as has been described herein.

It will be seen from the foregoing description that the invention is applicable to many different types of vehicles, whether these be marine, terrestrial, or aeronautical, the important point being the provision of at least two mounts for the superstructure that is carried by the mechanism of the present invention on the mounting means whether these be marine, hulls, endless treads, sledge runners, wheeled vehicles, or floats for airplanes.

It will be seen that in all of the illustrated forms, motion of one of the mounting means for the superstructure in one direction is compensated for automatically and simultaneously by equal and opposite motion of the other mounting means, such equal and opposite motion being transmitted through the systems of interconnected levers described herein so that the load-carrying superstructure remains substantially level transversely and with longitudinal pitch substantially compensated for, irrespective of vertical and horizontal displacements between the mounting means.

In all of the illustrated modifications of the invention, the immediate mechanism maintains certain definite relationships, which relationships may be summarized as follows:

1. The mechanism of the present invention permits independent longitudinal trimming of the mounting means, and independent vertical displacement of the mounting means in their respective vertical planes passing through the longitudinal center lines of each of the mounting means, the said vertical planes being continuously parallel to each other and to a reference plane perpendicular to the superstructure and intersecting the superstructure in a line parallel to the longitudinal axis of the superstructure, the side parallel vertical planes being continuously at constant distance from the reference plane.

2. The construction of the present invention permits the device to be set in an unlocked position or phase so that the respective mounting means for the superstructure may oscillate or roll transversely about the longitudinal axes of the mounting means, and the said longitudinal axes thereof remain continuously at a constant and equal distance from each other, irrespective of their relative position in a horizontal plane, and always at a constant and equal distance from the longitudinal axis of the superstructure, irrespective of their relative position in a plane horizontal thereof.

3. In the present construction, vertical axes drawn through the trunnion bearings in each of the mounting means will be at a constant distance and parallel to each other and to a vertical line drawn through the longitudinal center line of the load-carrying superstructure regardless of the direction of the relative displacements of the mounting means. In other words, the trunnion bearings of each of the mounting means are located in vertical planes which remain equidistant and parallel to each other and to the vertical plane passed through the longitudinal center line of the load-carrying superrelative longitudinal and transverse angular position of the mounting means.

4. In the present construction the trunnion bearings are mounted in a straight line in each of the mounting means, equidistant from the bottom of the mounting means and equidistant from the sides, and the trunnion bearings in each of the mounting means lie in a vertical plane longitudinally bi-secting the respective mounting means.

5. In the present construction the trunnion bearings are so mounted as to compensate for relative vertical displacement between the mounting means while maintaining the relative horizontal position of the mounting means constant so that a vertical plane passed through corresponding trunnion bearings in each mounting means will be maintained continuously, and constantly vertically perpendicular to both of the mounting means while allowing independent, transverse or lateral angular movement of mounting means.

Figure 26:
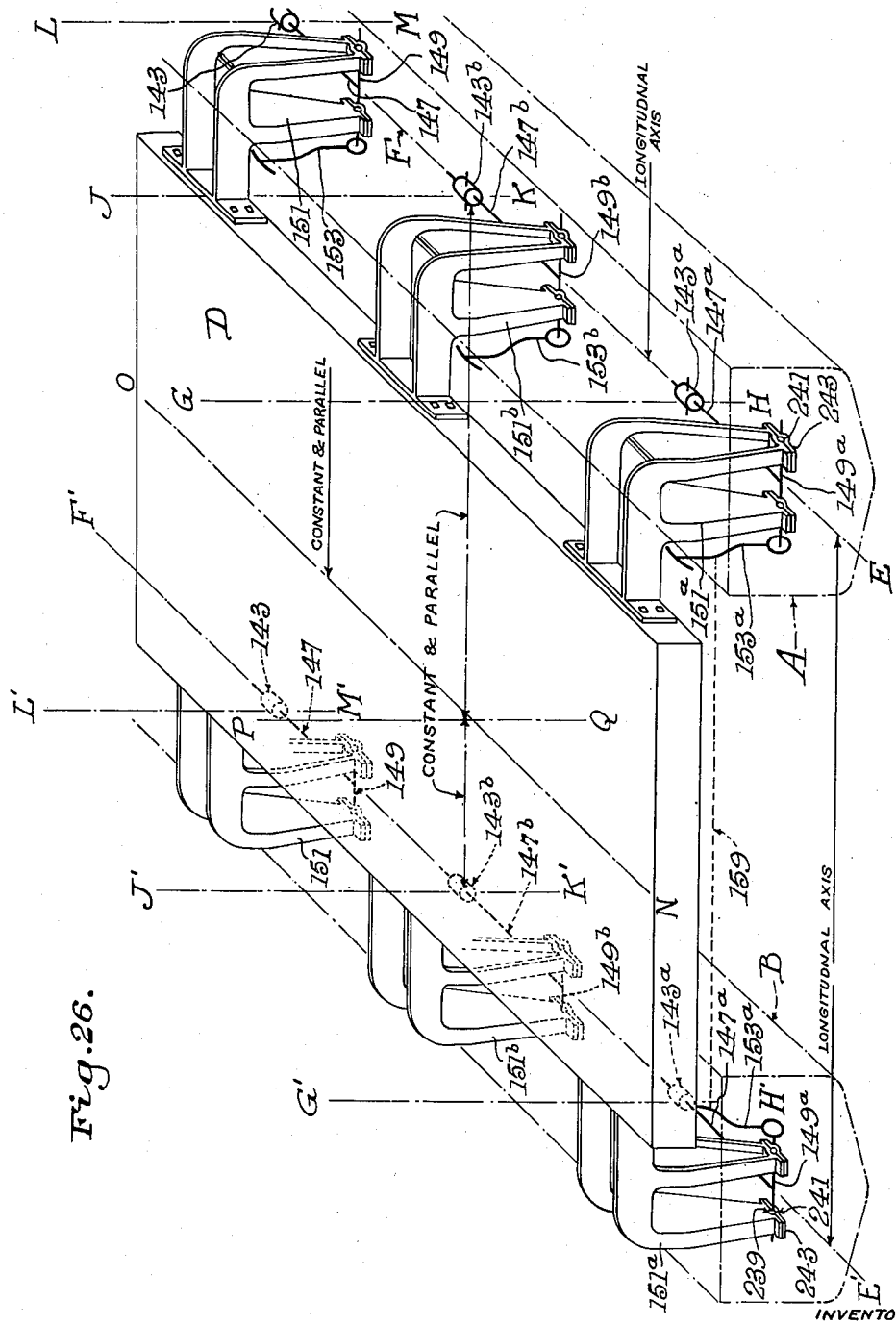
Figure 26 is an isometric perspective view showing the relationship between the longitudinal and transverse axes of the carriage members and of the superstructure.

These relationships are illustrated diagrammatically in Figures 26 and 27 of the drawings, which require no detailed description, in view of the diagrammatic showings and self-explanatory legends on these views. Thus, the trunnion bearings on Figures 26 and 27 are represented at 143, 143a and 143b, their respective axes being shown in dash and dot lines. The mounting means indicated on these views are referred to again as hulls A and B, although it will be understood that substantially any other type of mounting means may be employed to replace these hulls, as will be understood from the foregoing description. Figure 26 shows diagrammatic relationship of the parts of the present construction when the supporting means are at rest and Figure 27 shows diagrammatically the maintenance of these axial relationships independent of vertical and horizontal displacements between the mounting means.

These relationships are illustrated diagrammatically in Figures 26 and 27 of the drawings, which require no detailed description in view of the showings and the self-explanatory legends on these views. Thus, the trunnion bearings are designated on Figures 26 and 27 as 143, 143a and 143b, and the levers are indicated at 153, 153a and 153b. The lateral brackets are designated as 151, 151a and 151b, and the shafts mounted in these brackets upon which the levers are mounted are indicated at 149, 149a and 149b. These parts correspond to the designation on Figures 19 through 23. Lines EF, E'F' represent the longitudinal axes through the hulls, and lines GH, JK, LM on Figure 26 intersect the axis EF, and lines G'H', J'K' and L'M' intersect the axis E'F', as lines through the trunnion bearings perpendicular to the longitudinal axes of the hulls. In Figure 26 these lines are vertical, and with the longitudinal axes define vertical planes passed through the trunnion bearings and the longitudinal axes of the hulls. Line NO represents the longitudinal center line of the load-carrying superstructure and line PQ represents a line perpendicular to the center line or axis NO, and forms a vertical plane intersecting the superstructure D along the longitudinal center line thereof, and this plane constitutes a reference plane.

It will be seen, therefore, in Figure 26, that this reference plane is equidistant between the vertical planes through the longitudinal center lines of the hull, and being equidistant therefrom, is parallel to both of the latter planes.

When the hulls are displaced, as shown in Figure 27, for example, the equal and opposite rotation of the hulls effected by the motion-transmitting means 159, which may be the cables of the construction of Figure 19, or the pinion and shaft-transmission mechanism of Figure 14, maintains unchanged the distances and parallelism between these planes, as indicated in Figure 27, and the superstructure remains horizontal within the limits of articulation of mounting means therefor, notwithstanding the displacement between the hulls.

The modification of Figure 28 is generally similar to the form shown in Figure 17, and similar reference numbers are employed for similar parts, the differences being in the mounting for the lever arms 147, 147a and 147b. As in the previous view (Figures 17 and 19 through 23) the shafts 139, 139a and 139b are secured rigidly in the sides of the hulls A and B and the pillow blocks 141, 141a and 141b are keyed thereto by keys 162. Trunnion blocks 143, 143a and 143b are provided with trunnions 145, 145a and 145b which extend into the side arms of the pillow blocks, these side arms forming bearings for the trunnions as before.

The trunnion bearings are recessed suitably to receive a ball joint 233, each of the balls 233 having a hole therethrough for receiving the ends 146, 146a and 146b of the lever arms 147, 147a and 147b as described previously. As described previously also, these lever arms have the same action, so that they slide in the balls 233 and also turn relatively thereto. The balls 233 also are freely rotatable in the trunnion bearings. The trunnion bearings also are provided with outwardly flaring recesses 235 to permit and accommodate the movement of the lever arms incident to horizontal and transverse movement of the hulls A and B. In order to receive the balls 233, the trunnion blocks are made in two separate complemental parts, secured together by cap screws 237, as clearly shown in Figures 29 and 31.

In this connection, it may be noted that levers 153, 153a and 153b, and lever arms 147, 147a and 147b act as bell cranks turnable with shafts 149, 149a and 149b that are turnably mounted in brackets 155, 155a and 155b, in the bearings formed in these brackets. In all of these modifications, brackets 155, 155a and 155b and the corresponding elements of the other modifications are rigid plates that are rigidly secured to the superstructure D, the bottom end portion of the plates being recessed to define a bearing portion 239 for the shafts 149, 149a and 149b, the bearing being completed by the complementary recess 241 in closure plate 243 that is held by cap screws 245. Lever arms 153 and 147, 153a and 147a and 153b and 147b therefore act as integral units, movement of the lever arms 153, 153a and 153b causing a corresponding and equal longitudinal movement of the arms, 147, 147a and 147b and end portions 146, 146a and 146b thereof relative to the trunnion block in which the respective arm portions 146, 146a and 146b are mounted.

In the modification shown in Figures 14 through 23, for example, relative vertical, longitudinal displacement of the hulls A and B, whether by the action of wave motion or by irregular terrain, usually will be accompanied by rolling tendencies between the hulls; and unless the hulls are in horizontal position, that is free from pitching movement, the connections between the superstructure and the hulls are such that the hulls are not free to roll relative to each other, and rolling tendencies will set up stresses in the mechanism and hulls that must be absorbed or relieved. The modification shown in Figures 28 to 31, inclusive, is provided for relieving such stresses and the construction of this modification permits free movement of the hulls A and B in any direction.

In the modification shown in Figures 28 through 31, locking means are provided similar to the means shown in Figures 21 and 23. As previously described, the end of lever arms 147, 147a and 147b is slotted in each instance for the reception of locking lever 183 that is mounted pivotally on bracket 179 on the trunnion block 143, just as described in connection with Figures 20, 21 and 23. Also in Figure 28 the lever arms 147a are anchored against sliding movement in their trunnion block. The ball connection 233, shown in Figures 28 through 31, permits free universal movement between the hulls either vertically or transversely in any condition of displacement between the hulls, and the superstructure D remaining horizontal both in longitudinal and transverse direction independently of the positions of its hulls.

It will be understood that in the various modifications of the structure there may be provided resilient shock absorbing instrumentalities similar to those shown at 95, 95a and 95b in Figure 10, and also similar to the means shown in Figure 5. Also, the various modifications shown may embrace locking instrumentalities for the motion-transmitting instrumentalities.

Thus, the braking mechanism of Figures 9 and 9A may be used in conjunction with the latching mechanism employed in conjunction with ends 125, 125a and 125b of lever arms 119, 119a and 119b of Figures 14 through 16, which prevents lateral rotation of the hulls A and B about these lever arms. The braking mechanism can be applied in the same manner as illustrated in Figures 9 and 9A.

However, where motion between the hulls is transmitted through a cable, as indicated in the construction shown in Figures 17, 18 and 28 through 31, inclusive, the braking mechanism may be applied to the cable as indicated in Figures 32, 33 and 34. It will be understood that this braking mechanism is employed in connection with the latching instrumentalities employed in the construction of Figures 17 and 18 and 28 through 31 for latching the lever arms against rotation, thereby preventing independent rolling motion between the hulls.

In Figures 32, 33 and 34, the ends of each of the motion-transmitting cables are connected to resilient shock absorbing means 24, which means is similar in construction to that shown in Figure 13, and employed as is the case with Figure 10. Also applied to each cable is a pair of the locking means, there being one of the locking means on each side of the shock absorbing means for locking the cable against movement in either direction.

The locking means are similar in construction, and each comprises a clamp 247 that is adapted to engage the cable. This clamp 247 has an arm 248 that is received in a clamping recess 249 in the end of a bracket arm 251 that is secured to and depends from the superstructure D. Arm 248 is provided with a rack 253 which meshes with a pinion 255 mounted on a stub shaft 257 carried in bearings 259 on the bracket arm 251. Shaft 257 extends through these bearings and carries a brake drum 261, a brake band 263 enclosing the drum, one end of the brake band 263 being secured to the end of the angle bracket arm 265 which is joined with bracket arm 251 through plate 267 that is mounted on the underside of the superstructure D. The other end of the brake band 263 is engaged by a cam end 269 of a brake-operating lever 271 that extends through the superstructure D and operation of which clamps the brake band around the drum, thereby locking the pinion 255 on the rack 253 in any selected position desired, thereby locking the cables. This construction is repeated for each cable, and operation of these locking means, together with the locking means for the lever arms, prevents both independent rolling and pitching movements between the hulls and converts the entire structure into a rigid, unitary construction.

Similarly, if the motion of the hulls in any direction equals or exceeds the limits of articulation of the superstructure, the structure becomes rigid during that condition. When it is rigid and unitary, the superstructure D is not maintained horizontal, but in normal operation the improved mechanism of this construction maintains the superstructure D substantially horizontal in all directions independently of the relative displacements between the hulls in either vertical or transverse longitudinal directions, within the limits of articulation of the mounting means for the superstructure, imparted by wave motion or irregularities in terrain over which the vehicle embodying the construction of the present invention is traveling.

Attention is called to the fact that it is preferred to provide at least three connections between the superstructure D and each of the hulls A and B. However, as many more can be provided as enable the desired proportioning of the weight of the superstructure D and the load or cargo thereon between the respective cables or other connecting and motion-transmitting instrumentalities, so that there will be an equal distribution of weight on the cables, with no overloading. In this connection, it is to be noted that in all previous types of marine vessels of the twin hull type, that is vessels of the catamaran type, there can be only two points of flexible connections between the hulls, because of the fact that in all such prior vessels, the distance between the hulls becomes varied when vertical displacement of the hulls occurs. In order to accommodate such differences in distance, flexible connection at the bow and stern are provided and such flexible connections do enable the hulls at the bow or stern to separate or approach each other. An intermediate connection between the hulls cannot accommodate itself to such variable distances even if flexibly connected. The distances at the fore and aft connections between the hulls become shorter, while the distance at a center connection would remain fixed, thereby causing the hulls to bend outwardly at the center and strain either the hulls or the connections, or cause breakage thereof. In the present construction, such stresses and breakage dangers are eliminated and the load-carrying superstructure is maintained substantially horizontal within limits of articulation of the mounting means for the superstructure, independently of the relative position between the hulls, and the load is distributed equally between the supports, thereby obviating overloading any one of them.

It will be apparent that the invention includes carriage members and means for supporting a superstructure thereon, the supporting means being articulately connected to the superstructure at each side thereof and so interconnected that rise or fall of one of the carriage members automatically causes a corresponding fall or rise of its opposite member. Such arrangement within the limits of articulation accommodates transverse unevenness of the surface over which the structure passes so that transverse tilting of the superstructure is substantially eliminated and longitudinal tilting thereof substantially reduced. Furthermore, that the specific mounting described, in all its forms, is adapted to relieve the superstructure of stress which would otherwise result from the vertical shifting of the carriage members. In addition, the mounting arrangement permits the use of as many mounting supports as desired rather than being restricted to a pair of such supports as has been required heretofore where conventional mounting means have been employed.

Accordingly, the invention is not limited to the specific construction of the illustrated embodiments, but only as appears in the appended claims.

Having thus described my invention, what I claim as new and wish to secure by Letters Patent is:

1. A transportation vehicle comprising, in combination, a pair of longitudinally parallel, transversely spaced, oppositely disposed carriage means, a load-carrying platform vertically spaced therefrom, articulated means oppositely disposed connecting the carriage means to the said platform at points spaced longitudinally thereof, the said articulated means comprising trunnion bearings attached to the carriage means, bell crank levers operatively connected at one end thereof to the said bearings, brackets depending from the said platform, the said levers being pivotally connected to the brackets, a plurality of motion-reversing transmission means extending transversely of the platform and spaced longitudinally thereof, each of the said transmission means interconnecting respective pairs of oppositely disposed, articulated means at the other ends of the said bell crank levers, so constructed and arranged that a relative vertical displacement of one of the said pair of carriage means will result in a vertical displacement of the other of the said pair of carriage means in an opposite direction.

2. A transportation vehicle comprising, in combination, a pair of longitudinally parallel, transversely spaced, oppositely disposed carriage means, a load-carrying platform vertically spaced therefrom, articulated means oppositely disposed connecting the carriage means to the platform at points spaced longitudinally thereof, the said articulated means comprising bearing means attached to the carriage means, lever means operatively connected at one end thereof to the bearing means, brackets projecting from the platform, the lever means being pivotally connected to the brackets, a plurality of motion-reversing transmission means extending transversely of the platform and spaced longitudinally thereof, each of the said transmission means interconnecting respective pairs of oppositely disposed, articulated means at the other ends of the lever means, so constructed and arranged that a relative vertical displacement of one of the said pair of carriage means will result in a vertical displacement of the other of the carriage means in an opposite direction.

3. A vehicle comprising a pair of spaced, parallel carriage means, a load-carrying platform, oppositely disposed articulated means connecting said carriage means to said platform at longitudinally equally spaced points thereof, said articulated means comprising bearing means attached to said carriage means, levers pivotally connected to said bearing means, motion-reversing transmission means extending transversely of said platform and spaced longitudinally thereof, each of said transmission means interconnecting respective pairs of oppositely disposed, articulated means, each lever connecting a transmission means and a bearing means, so constructed and arranged that a relative vertical displacement of one of said pair of carriage means will result in a vertical displacement of the other of said pair of carriage means in the opposite direction.

4. A transportation vehicle construction as set forth in claim 1, wherein the motion-reversing transmission means comprise oppositely directed shaft means interconnecting opposite levers on the carriage means, oppositely disposed spaced bevel gears on the shaft means, each of the said gears being adapted to be rotated by pivotal movements of the lever means and the shaft means actuated thereby, and an intermediate bevel gear engaging the said oppositely disposed gears for reversely transmitting the rotation of one of the oppositely disposed bevel gears to the opposing gear, whereby displacement of one of the carriage means imparts an equal and opposite displacement of the other of the carriage means.

5. A transportation vehicle construction as set forth in claim 1, wherein the motion-reversing transmission means comprise oppositely directed shafts interconnecting opposite levers on the carriage means, a housing on the shafts, a hub member in each housing secured to the respective shafts and provided with a plurality of radially extending arms, projecting abutment members extending radially inwardly from the housings intermediate the said arms, coil spring members mounted in compression between the said arms and abutment members, oppositely disposed spaced bevel gears on the oppositely directed shafts, each of the said gears being adapted to be rotated by the shafts responsively to movements of the levers connected to the shafts, and an intermediate bevel gear engaging the said oppositely disposed gears for reversely transmitting rotation of one of the bevel gears to the opposing gear, whereby displacement of one of the carriage means imparts an equal and opposite displacement of the other of the carriage means through the articulated means and the platform, thereby maintaining the platform in stable horizontal equilibrium within the limits of articulation of the articulated means independently of displacements between the carriage means, the said coil spring members being disposed and arranged to transmit equal and opposite rotation to the opposite bevel gears while eliminating any mechanical shocks on the motion-transmitting means from being imparted to the said opposite bevel gears.

6. A transportation vehicle construction as claimed in claim 1, wherein the bell crank levers are oppositely disposed in pairs on the opposite carriage means and are symmetrically positioned on each of the carriage means, and the motion-reversing transmission means comprise flexible cables interconnecting the oppositely disposed levers of each pair, and sheave means on the platform engaged by and carrying the flexible cables, the said cables being so arranged and connected to the oppositely disposed levers of each pair that movement of one of the levers responsively to relative displacement betwen the carriage means produces through the cables, substantially equal movement of the other oppositely disposed lever and in the opposite direction for maintaining the platform in stable horizontal equilibrium within the limits of articulation of the articulated means independently of displacements between the carriage means.

7. A transportation vehicle construction as set forth in claim 1, wherein the motion-reversing transmission means comprise bell crank levers oppositely disposed in pairs on the opposite carriage means and are symmetrically positioned on each of the carriage means, gear segments attached to and actuated by the said levers, pinions carried by the platform in engagement with the gear segments, shaft means mounted on the pinions for rotation therewith, oppositely disposed bevel gears on the said shaft means and rotatable therewith, and an intermediate bevel gear engaging the said oppositely disposed gears for reversely transmitting the rotation of one of the oppositely disposed beveled gears to the opposing gear, whereby displacement of one of the carriage means imparts an equal and opposite displacement of the other of the carriage means.

8. A transportation vehicle construction as set forth in claim 1, wherein the articulated means comprise oppositely disposed trunnion bearings attached to each of the carriage means at equally spaced distances and symmetrically disposed relation thereto, a pillow block pivotally mounted in the trunnion bearings, trunnion blocks pivotally mounted on the pillow blocks, laterally extending trunnions on the trunnion blocks pivotally secured in the pillow blocks, the bell crank levers being oppositely disposed in pairs on the carriage means adjacent to the trunnion bearings and having one arm extended into and slidably received in the trunnion blocks, the said lever arms being also freely rotatable relative to the trunnion blocks, the other arm of the bell crank levers extending upwardly relative to the carriage means, and the motion-reversing transmission means comprising flexible cables interconnecting the upwardly extending, oppositely disposed lever arms of each pair, and sheave means on the platform engaged by and carrying the flexible cables, the said cables being so arranged and connected to the oppositely disposed levers of each pair that movement of one of the bell crank levers responsively to relative displacement between the carriage means produces through the cables, substantially equal movement of the other oppositely disposed bell crank lever and in the opposite direction for continuously maintaining the platform in stable horizontal equilibrium within the limits of articulation of the mounting means independently of displacements between the carriage means, the said laterally extending trunnions being mounted on the carriage means in a single plane passing longitudinally through the carriage members and trunnions, whereby there is enabled independent, longitudinal trimming of the carriage means, and independent, vertical displacement of the carriage means in their respective vertical planes passing through the longitudinal center line of each carriage means, the said vertical planes being constantly parallel to each other and to a reference plane perpendicular to the platform and intersecting the platform in a line parallel to the longitudinal axis of the platform, the said parallel vertical planes being continuously at constant distance from the reference plane independently of relative displacements between the carriage means.

9. A transportation vehicle as claimed in claim 8, wherein the vehicle is a catamaran-type boat, and the carriage means are the hulls thereof, the articulated means also including locking instrumentalities associated with the bell crank levers and articulated mountings thereof for inactivating the said articulated means.

10. A transportation vehicle comprising a pair of longitudinally parallel, transversely spaced, oppositely disposed carriage means, a load-carrying platform vertically spaced therefrom, articulated means oppositely disposed connecting the carriage means to the platform at points spaced longitudinally thereof, the articulated means comprising trunnion bearings attached to the carriage means, bell crank levers oppositely connected at one end thereof to the bearings, the said levers being pivotally movable in the bearings, one pair of the said levers being restrained in its bearings against longitudinal movement relative thereto while the remaining levers are longitudinally movable in their bearings as well as being pivoted therein, brackets depending from the platform, the said levers being pivotally connected to the brackets, a plurality of motion-reversing transmission means extending transversely of the platform and spaced longitudinally thereof, each of the transmission means interconnecting respective pairs of oppositely disposed, articulated means at the other ends of the said levers, so constructed and arranged that a relative vertical displacement of one of the said pair of carriage means will result in a vertical displacement of the other of the said pair of carriage means in an opposite direction.

11. A transportation vehicle comprising, in combination, a pair of longitudinally parallel, transversely spaced, oppositely disposed carriage means, a load-carrying platform vertically spaced therefrom, articulated means oppositely disposed connecting the carriage means to the platform at points spaced longitudinally thereof, the said articulated means comprising trunnion bearings attached to the carriage means, bell crank levers connected at one end thereof to the trunnion bearings, brackets depending from the platform, the said levers being pivotally connected to the brackets, a plurality of motion-reversing transmission means extending transversely of the platform and spaced longitudinally thereof; each of the transmission means interconnecting respective pairs of oppositely disposed, articulated means at the other ends of the bell crank lever, so constructed and arranged that a relative vertical displacement of one of the pair of carriage means will result in a vertical displacement of the other of the pair of carriage means in an opposite direction, the said bearings in each of the carriage means being mounted in the vertical plane of the longitudinal axis of their carriage means and also at the intersection of equally spaced, transverse, vertical planes intersecting the said vertical planes of the longitudinal axes of the carriage means at right angles thereto, the vertical planes of the said longitudinal axes of the carriage means being continuously parallel to and equidistant from one another and from the vertical plane of the longitudinal axis of the platform.

12. A transportation vehicle comprising a pair of longitudinally parallel, transversely spaced, oppositely disposed carriage means, a load-carrying platform carried thereby, articulated means oppositely disposed connecting the carriage means to the platform at points spaced longitudinally thereof, the said articulated means comprising trunnion bearings attached to the carriage means and positioned in a common horizontal plane extending through the carriage means, lever means operatively connected at one end thereof to the bearings, spaced brackets extending from the platform, the said lever means being pivotally connected to the brackets, a plurality of motion-reversing transmission means extending transversely of the platform and spaced longitudinally thereof, each of the transmission means interconnecting respective pairs of oppositely disposed articulated means at the other ends of the said lever means, so constructed and arranged that a relative vertical displacement of one of the pair of carriage means will result in a vertical displacement of the other of the carriage means in the opposite direction, the said articulated means continuously maintaining the vertical planes of the longitudinal axes of the carriage means equidistant from each other and from the vertical plane of the longitudinal axis of the platform, and the vertical plane of the transverse axes of the carriage means parallel to and equidistant from a reference plane extending vertically through the platform at right angles to the longitudinal axis of the platform irrespectively of amounts of vertical longitudinal and transverse displacements between the carriage means, thereby maintaining the load-carrying platform continuously substantially horizontal in all directions, and in continuously stable equilibrium within the limits of articulation of the said articulated means and independently of any relative displacements between the carriage means.

13. A water craft comprising a pair of longitudinally parallel, transversely spaced hulls, a load-carrying deck, means articulately carrying the deck on the hulls, said means comprising oppositely disposed trunnion bearing means mounted on each of the trunnion bearing means, an points thereof, transverse bearing means mounted on each of the trunnion bearing means, an arm of a bell crank lever mounted in the transverse bearing means, bracket means depending from said platform, said levers being pivotally connected to said brackets, locking means for rendering inoperative the transverse bearing means, the arms of all except one pair of oppositely disposed levers being slidably mounted in the transverse bearing means, sheave means mounted on the platform adjacent each bell crank lever, and cable means attached to the other arm of each bell crank and connecting such arms of oppositely disposed levers, the cable means engaging the sheave means such that longitudinal angular displacement of a bell crank lever is transmitted through the cable to produce equal and opposite movement of the oppositely positioned bell crank lever.

14. A catamaran-type water craft comprising a pair of parallel, longitudinally spaced hulls, a load-carrying deck, a plurality of oppositely disposed articulated means mounting the deck on the hulls, said means comprising transversely disposed trunnion bearings mounted at spaced points along the hulls, an arm of a bell crank lever mounted in each of the bearings, brackets depending from the deck, said levers being pivotally connected to said brackets, sheave means mounted on the deck adjacent each lever, and cable means attached to the other arm of each lever and connecting corresponding arms of oppositely disposed levers, the cable means engaging the sheave means such that angular displacement of the lever is transmitted through the cable to produce equal and opposite movement of the oppositely disposed bell crank levers, the arms of all except one pair of oppositely disposed levers being slidably mounted relative to the trunnion bearing.

15. A transportation vehicle comprising a pair of longitudinally parallel, transversely spaced, oppositely disposed carriage means, a load-carrying platform vertically spaced therefrom, articulated means oppositely disposed connecting the carriage means to the platform at spaced points longitudinally thereof, the said articulated means comprising trunnion bearings attached to the carriage means in a common horizontal plane passed through the carriage means and in relatively opposite relation so that opposite pairs of the trunnion bearings are located at the intersection of equally spaced, vertical, parallel planes passed transversely through the carriage means at right angles thereto; and parallel, vertical planes passed longitudinally through the carriage means along the longitudinal axes thereof, bell crank levers operatively connected at one end thereof to the trunnion bearings, brackets depending from the platform, the said bell crank levers being pivotally connected to the said brackets and having their respective arms normally parallel, means acting on corresponding members of one of the pairs of opposite bell crank levers to lock the said levers in their trunnion bearings against longitudinal sliding movement in their trunnion bearings, the remaining pairs of levers being slidable longitudinally in their trunnion bearings, a plurality of motion-reversing transmission means extending transversely of the platform and spaced longitudinally thereof, each of the transmission means interconnecting respective pairs of oppositely disposed, and articulated means at the other ends of the bell crank levers so constructed and arranged that a relative, vertical displacement of one of the carriage means will result in a vertical displacement of the other of the carriage means in the opposite direction, thereby maintaining the said platform continuously substantially horizontal in all directions and in continuously stable equilibrium within the limits of articulation of the articulated means and independently of any relative displacements between the carriage means.

16. A transportation vehicle comprising a pair of longitudinally parallel, transversely spaced, oppositely disposed carriage means, a load-carrying platform carried by the carriage means in spaced relation thereto, arms pivotally connected to the carriage means at spaced points therealong, bracket means depending from said platform, said arms being pivotally connected to said bracket means, and motion-reversing transmission means extending transversely of said platform and spaced longitudinally thereof, each of said transmission means interconnecting respective pairs of oppositely disposed, spaced arms on the carriage means, so constructed and arranged that a relative, vertical displacement of one of said pair of said carriage means will result in a vertical displacement of the other of said pair of carriage means in an opposite direction while maintaining the vertical planes including the longitudinal axes of the platform and carriage means continuously parallel and equidistant.

17. A vehicle comprising a pair of spaced, parallel pontons, a load-carrying platform vertically spaced therefrom, arms pivotally connected to the pontons at spaced points therealong, and motion-reversing transmission means extending transversely of said platform and spaced longitudinally thereof, each of said transmission means interconnecting respective pairs of oppositely disposed, spaced arms on the pontons, the said arms being symmetrically disposed in opposition relative to the pontons.

WILLIAM E. GILMORE.

REFERENCES CITED

The following references are of record in the file of this patent:

UNITED STATES PATENTS

| Number | Name | Date |
|---|---|---|
| Re. 14,801 | Flory | Feb. 3, 1920 |
| 189,459 | Herreshoff | Apr. 10, 1877 |
| 945,309 | Enebo et al. | Jan. 4, 1910 |
| 1,344,903 | Koiransky | June 29, 1920 |
| 1,348,333 | Swan | Aug. 3, 1920 |
| 1,609,783 | Smith | Dec. 7, 1926 |
| 1,846,602 | Lake | Feb. 23, 1932 |
| 2,119,775 | Chase | June 7, 1938 |
| 2,165,633 | Hunt | July 11, 1939 |